United States Patent [19]

Teraoka

[11] Patent Number: 4,460,428
[45] Date of Patent: Jul. 17, 1984

[54] SCALING AND LABELING APPARATUS

[75] Inventor: Kazuharu Teraoka, Tokyo, Japan

[73] Assignee: Teraoka Seiko Co. Ltd., Tokyo, Japan

[21] Appl. No.: 480,276

[22] Filed: Mar. 30, 1983

[30] Foreign Application Priority Data

| Mar. 31, 1982 | [JP] | Japan | 57-46661[U] |
| Sep. 11, 1982 | [JP] | Japan | 57-158567 |
| Sep. 14, 1982 | [JP] | Japan | 57-161272 |
| Sep. 14, 1982 | [JP] | Japan | 57-140251[U] |
| Sep. 14, 1982 | [JP] | Japan | 57-140253[U] |
| Sep. 30, 1982 | [JP] | Japan | 57-148191[U] |
| Oct. 5, 1982 | [JP] | Japan | 57-151789[U] |
| Oct. 30, 1982 | [JP] | Japan | 57-165949[U] |
| Nov. 30, 1982 | [JP] | Japan | 57-210745[U] |
| Nov. 30, 1982 | [JP] | Japan | 57-210745 |

[51] Int. Cl.$^3$ .................................. B44B 9/00
[52] U.S. Cl. ................................ 156/360; 156/384; 364/466
[58] Field of Search .................. 156/360, 384; 53/502; 364/466

[56] References Cited

U.S. PATENT DOCUMENTS 3,544,412 12/1970 Arvidson et al. ............... 156/360
3,732,966 5/1973 Treiber ...................... 156/360 X Primary Examiner—David A. Simmons
Attorney, Agent, or Firm—Watson, Cole, Grindle & Watson

[57] ABSTRACT

This invention relating to an improvement of a scaling and labeling apparatus which is assembled to a packing machine for automatically or semiautomatically packing the product, scaling the packed product packaged by the packing machine automatically and adhering a priced label automatically to the packed product by a labeling unit, characterized in that the packed product is scaled while it is temporarily stopped on the scaling unit, the packed product after its scaling is fed out toward the feeding-out passage directly extending laterally from on the scaling pan of the scaling unit so as to improve an accuracy of scaling, simplify the structure and provide a light weight and small-sized scaling and labeling device.

45 Claims, 84 Drawing Figures

FIG. 49
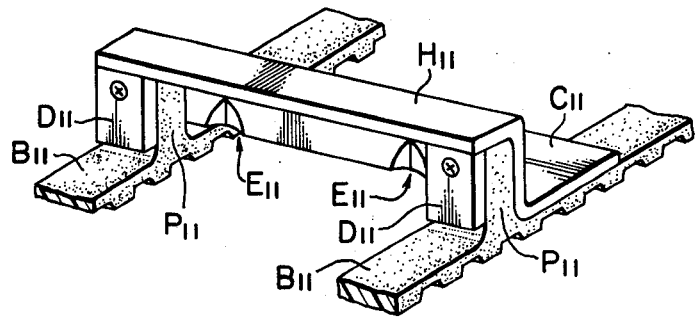
FIG. 50
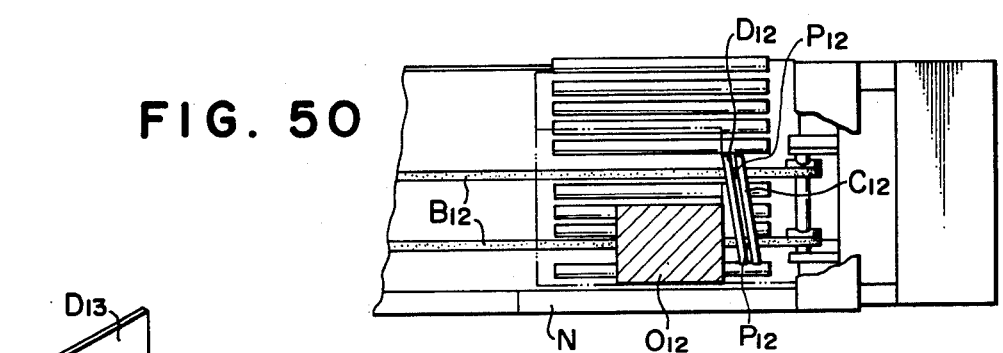
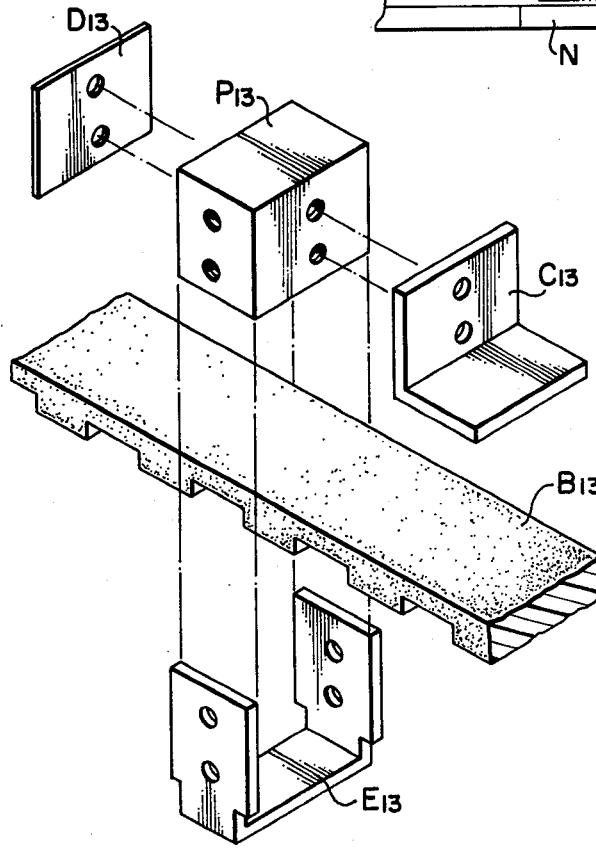
FIG. 51

SCALING AND LABELING APPARATUS

BACKGROUND OF THE INVENTION

1. Field of the Invention

This invention relates to a scaling and labeling apparatus, and more particularly to an apparatus which is assembled to a packaging machine for automatically or semi-automatically packaging products, scales automatically the products (packed products) packaged by said packaging machine and in which a price label is automatically applied to the packed products by a labeling unit.

2. Description of the Prior Art

Conventional type of a scaling and labeling apparatus is of such a construction as a scaling conveyor having a scaling unit and a mounting block composed of a roller conveyor are arranged continuously in series form in respect to its feeding direction at a terminal end of the feeding passage wherein the packaging operation of the packaging machine is completed, a labeling unit is mounted on said mounting block and there are arranged a feeding passage extending in a direction perpendicular to said feeding direction, and a feeding means. In the above-mentioned conventional type of the scaling and labeling apparatus, it is operated such that the scaling of the packed products is completed by the scaling unit while the packed products reaches to the terminal end of the feeding passage in the packing machine is moved on the scaling conveyor, a price label is adhered to the packed products approached to the mounting block, thereafter said products are transmitted along the feeding passage.

However, the conventional type of the scaling and labeling apparatus shows a disadvantage that a part of the inertia vector is acted upon the scaling unit to cause its operation to be disordered during a transmission of the product, thereby its accurate scaling could not be applied due to the fact that the packed products were scaled during their movement on the scaling conveyor.

Since a lengthy time is required for the scaling unit to get a desired stable scaling operation, the scaling conveyor should have a longer length or a slow transmitting speed of the scaling conveyor should be kept, resulting in that the former case shows a disadvantage of providing a large-sized scaling conveyor and the latter case also shows a disadvantage of decreased efficiency of operation. Further, an arrangement of the mounting block and the transmitting passage in front of the scaling conveyor causes a mounting floor area of the apparatus to be increased.

SUMMARY OF THE INVENTION

It is an object of the present invention to eliminate the above-mentioned prior disadvantages and to provide a scaling and labeling device having a simple structure and light weight small sized configuration in which the packed products are scaled while they are stopped temporarily on the scaling unit, the packed products after their scaling are fed directly from the scaling pan of said scaling unit to a feeding-out passage extending laterally, thereby an accuracy of scaling is improved.

This invention is characterized by a scaling and labeling apparatus in which a scaling unit and a labeling unit are arranged in the transmitting passage for the packed products which is continuous to the terminal end of the transmitting passage of the packaging machine, the packed products are scaled by said scaling unit and a label relating to said produts is adhered to them by the labeling unit, wherein the packed products are scaled while the scaling unit receives the packed products on said transmitting passage and stops them temporarily thereon, and further there are provided a feeding-out passage for use in moving the packed products on the scaling unit in a direction perpendicular to said transmitting passage and a feeding-out means.

It is another object of the present invention to prevent two or more packed products from being fed onto the scaling unit, and even if they are fed into the scaling unit, they are fed out of the scaling unit at once, an accurate and efficient scaling operation is performed to prevent the packed products from being clogged in the transmitting passage.

It is still further object of the present invention to provide such an arrangement as a scaling pan member of a scaling unit is constructed by a roller conveyor, wherein the packed products can positively be fed onto said scaling pan member from the terminal end of the transmitting passage in the packaging machine without being fallen and a braking force of said roller conveyor is adjusted to get a suitable feeding speed.

It is still further object of the present invention to discriminate if the packed products reached onto the scaling unit are one having no disturbance in their weight and requiring no scaling (called as a rated product) or one having some disturbances in their weight and requiring scaling (called as a non-rated product), and if they are a rated product, an energization timing with that of the feeding-out means and a label issuing operation of the labeling unit are made fast together to get a high speed operation.

It is still further object of the present invention to to make an initial load of the scaling unit minimum, to assure a range of scaling as well as to improve an accuracy of scaling operation.

It is yet further object of the present invention to apply a belt conveyor having a pusher means which is intermittently driven in the feeding-out passage and the feeding-out means, to make an accurate stopping position of said conveyor and to facilitate an adjustment of the stopping position.

It is still further object of the present invention to prevent a deformation of the pusher means in said conveyor belt having a pusher, to provide a stable feeding-out of the packed products and to increase a durability of the conveyor.

It is still yet further object of the present invention to provide a support structure for said labeling unit, wherein the label is always issued with its attitude being uprighted without inclined labeling unit to keep a close contact between the packed products and the label to be adhered thereto and further to enable an adjustment of a position and a direction of the labeling unit as well as to adhere the label at any position in the products.

It is still further object of the present invention to provide a raised guide plate at one side of said feeding-out passage, to arrange a mechanism for guiding the packed products to be abutted against said plate, to perform an accurate positioning of the products during their feeding-out and transmitting operation and further to make a correct adhering position and orientation of the label without having any disturbance thereof.

It is still further object of the present invention to provide such a frame of the device as said frame is made small and an easy filling and replacing of the packaging sheet roll in the packaging machine is performed.

It is still further object of the present invention to provide a scaling and labeling apparatus provided with a feeding-out passage for changing a feeding direction of the packed products in a perpendicular direction to said feeding-out passage at a terminal end thereof, wherein a clogging or jamming of the packed products is prevented when they are transferred from said feeding-out passage to the discharging passage.

BRIEF DESCRIPTION OF THE DRAWINGS

FIG. 49 is a perspective view for showing another modification of the present invention.

FIG. 50 is a top plan view of another preferred embodiment of the present invention.

FIG. 51 is an exploded perspective view for showing another modification of the present invention.

DESCRIPTION OF THE PREFERRED EMBODIMENTS

Figure 1:
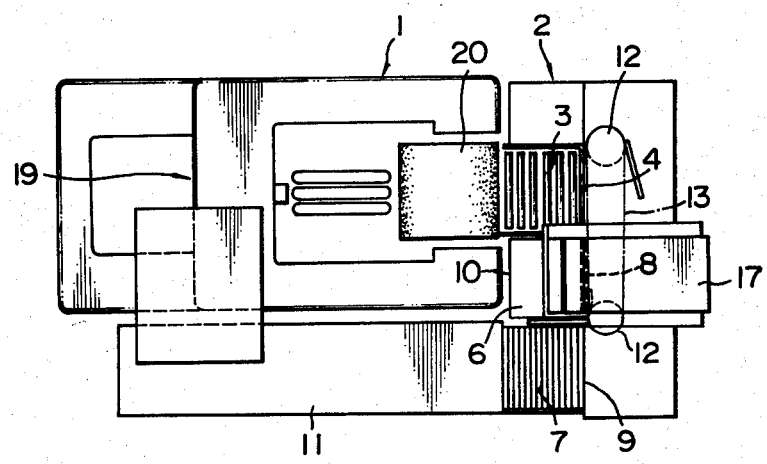
FIG. 1 is a top plan view of the apparatus constructed in accordance with the present invention.
Figure 2:
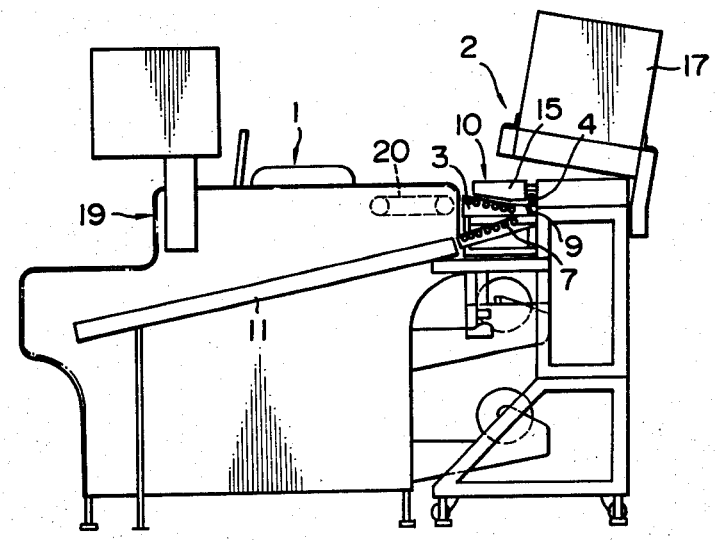
FIG. 2 is a front elevational view of FIG. 1.
Figure 3:
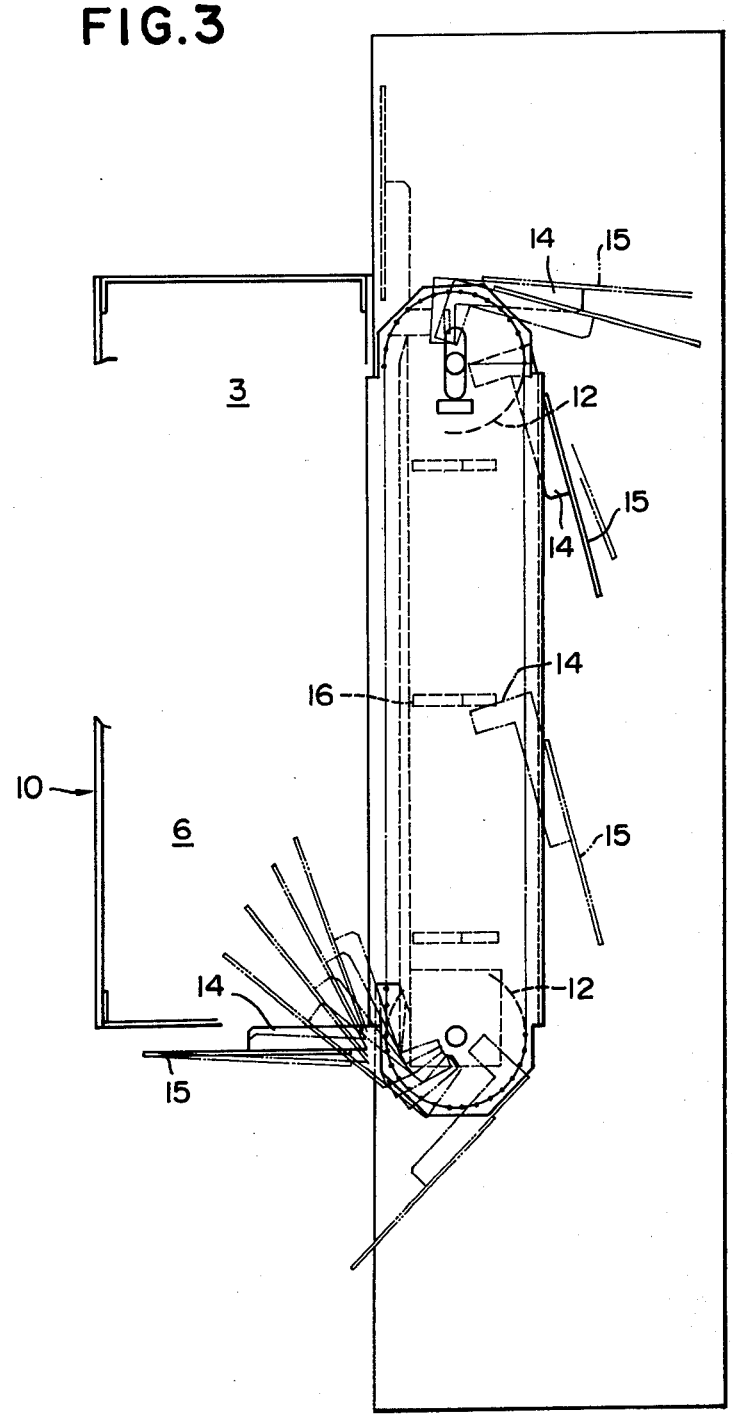
FIG. 3 is an enlarged top plan view of a substantial part of the present apparatus.
Figure 4:
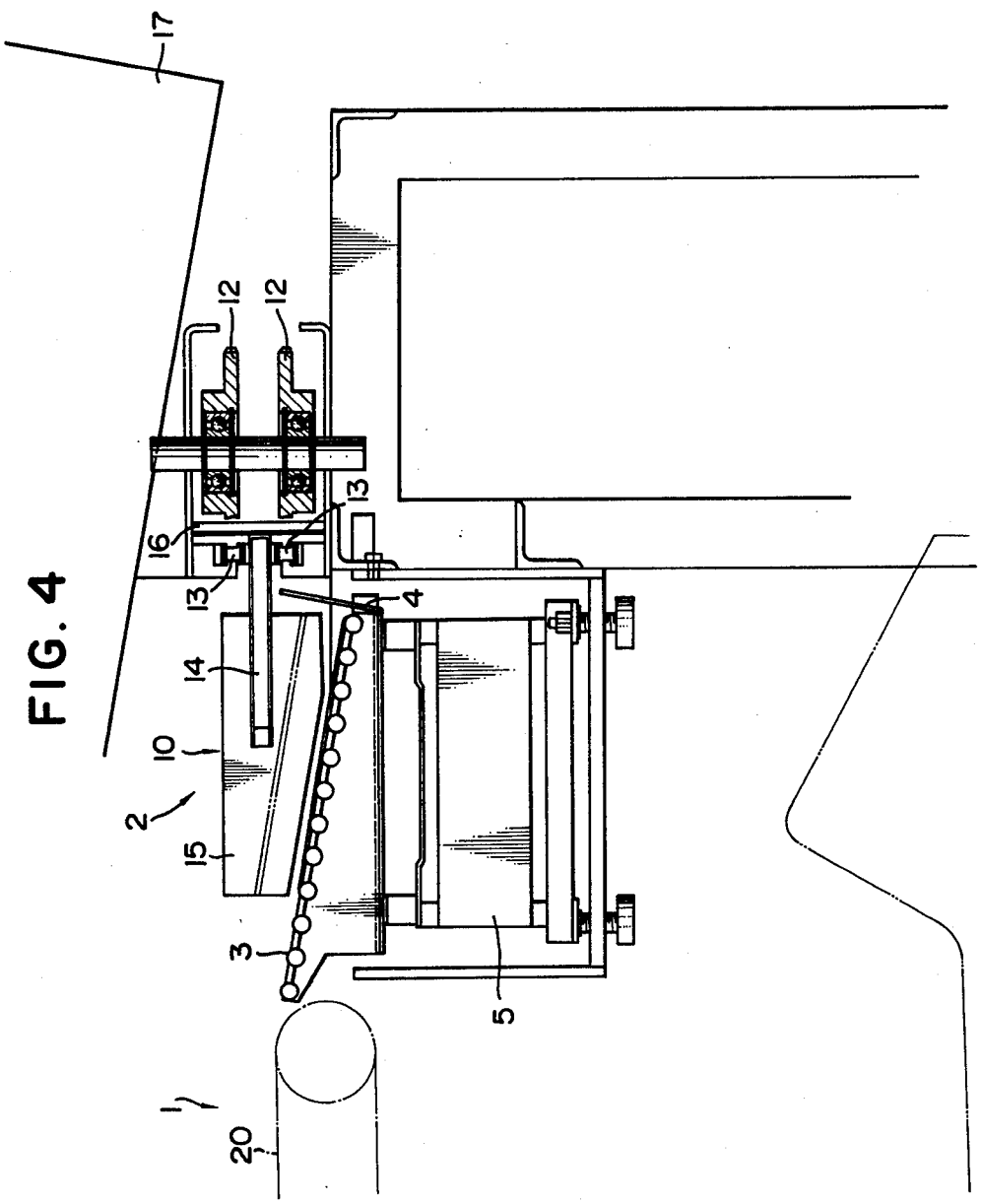
FIG. 4 is an enlarged longitudinal front elevational view in section of a substantial part of the present apparatus.
Figure 5:
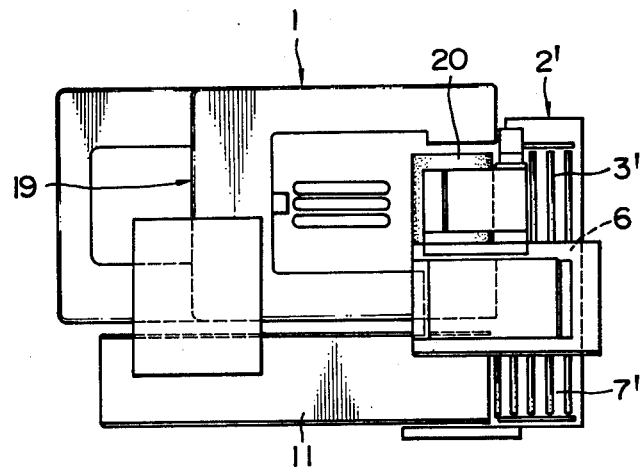
FIG. 5 is a top plan view of a preferred embodiment of the present invention.
Figure 6:
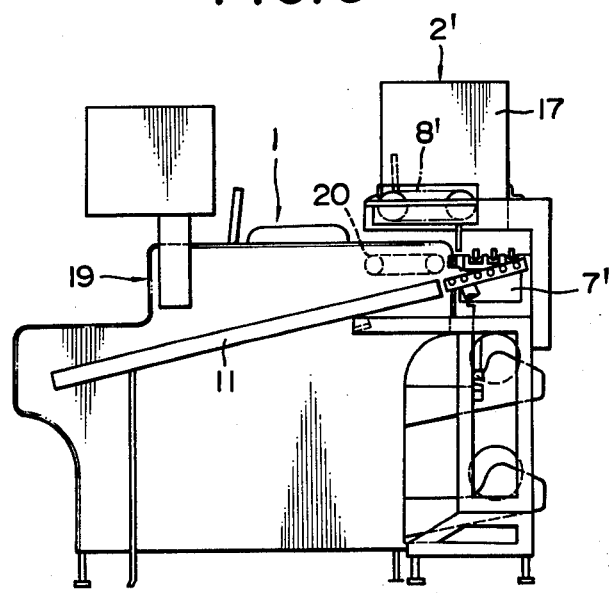
FIG. 6 is a front elevational view of FIG. 5.
Figure 7:
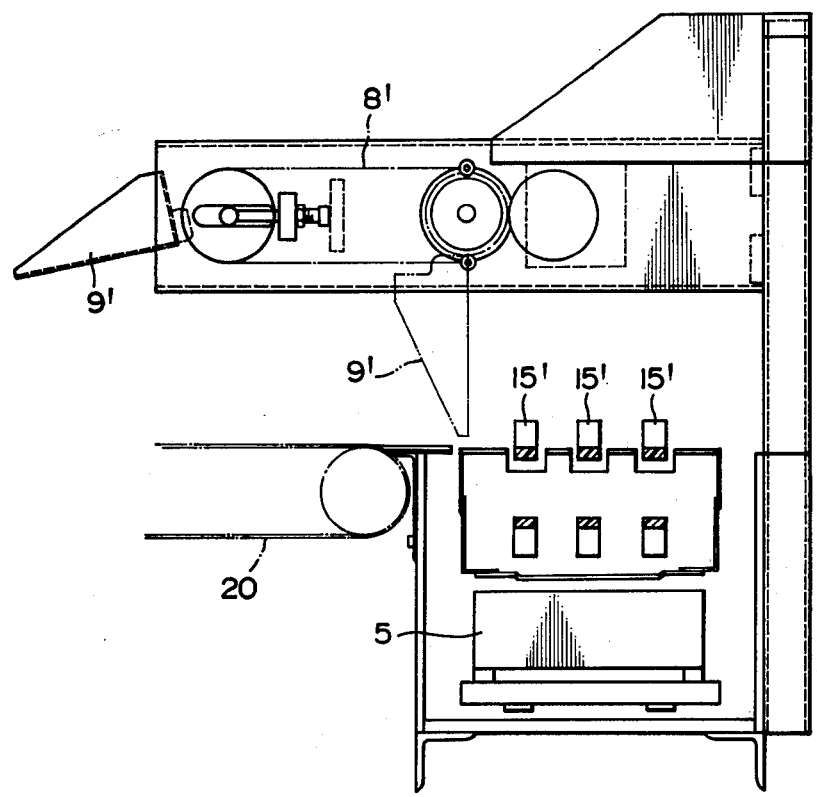
FIG. 7 is an enlarged longitudinal front elevational view in section of a substantial part of the present apparatus.
Figure 8:
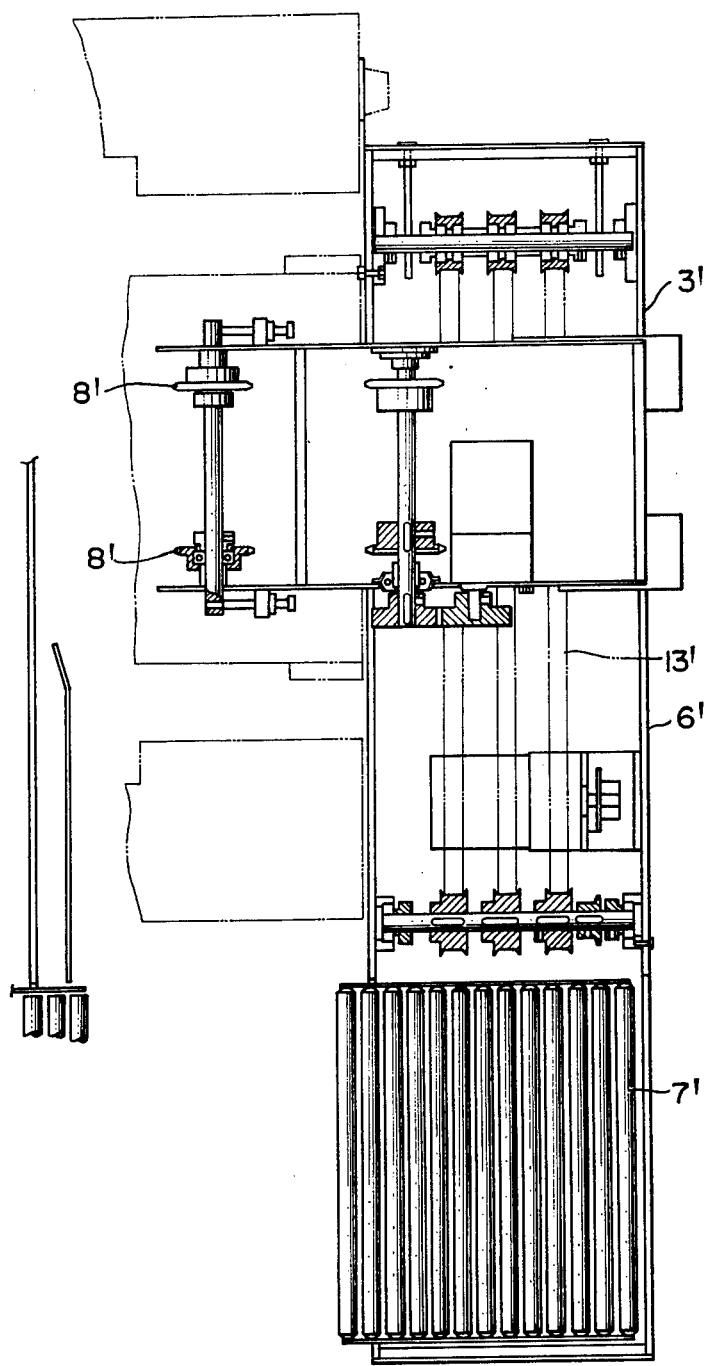
FIG. 8 is an enlarged top plan view of a substantial part of the present apparatus in partly broken away.
Figure 9:
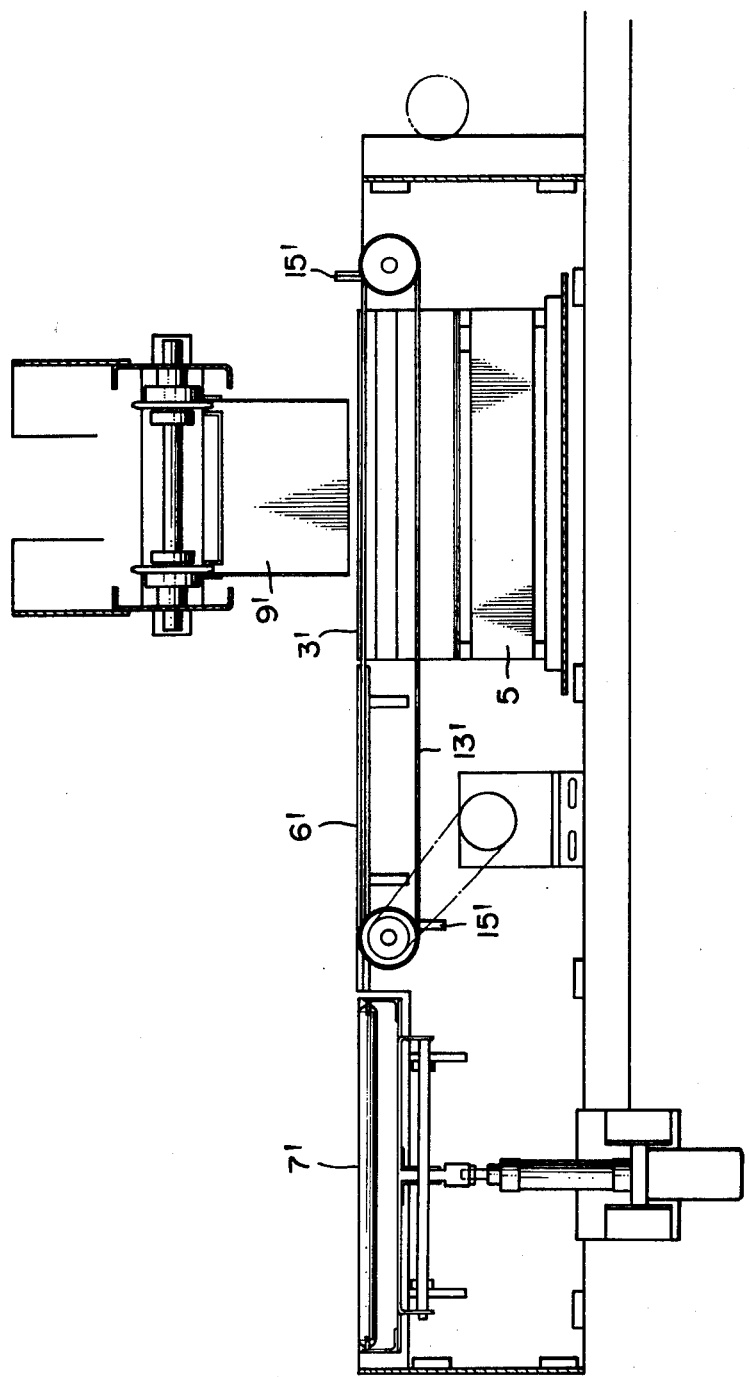
FIG. 9 is a longitudinal side elevational view in section of a substantial part of the present apparatus.
Figure 10:
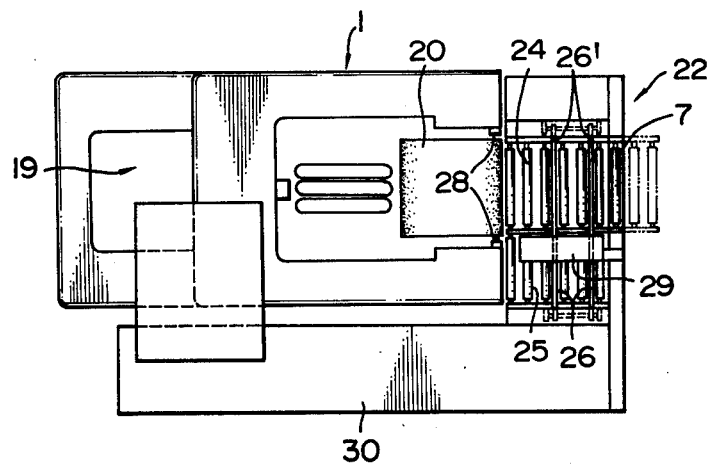
FIG. 10 is a top plan view of another preferred embodiment of the present invention.
Figure 11:
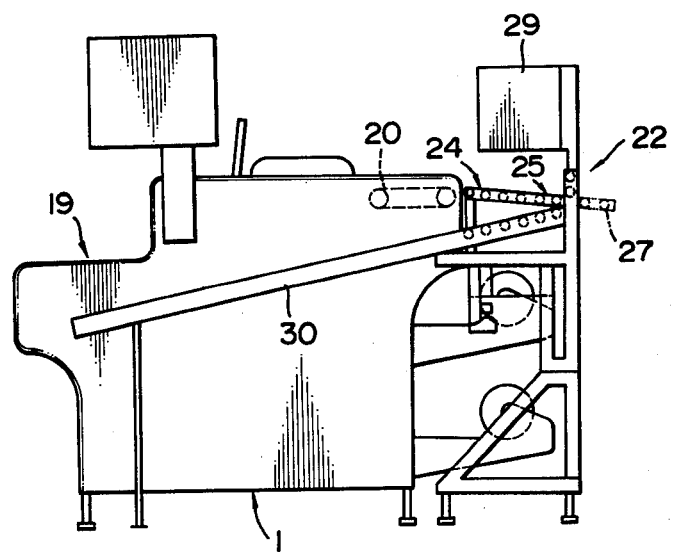
FIG. 11 is a front elevational view of the preferred embodiment of the present apparatus.

In reference to FIGS. 1 to 4, a basic form of the present invention will be described. In the figures, (1) is an automatic packing machine and (2) is a scaling and labeling device which is assembled in front of said automatic packing machine in such a way as it may be moved to or away therefrom.

Automatic packing machine (1) has a feeding-in opening (19) at its inlet side, wherein the products transmitted from said opening (19) are packed, then placed on the heater conveyor (20) and transmitted out thereby.

The scaling and labeling device (2) is constructed such that at first an inclined roller conveyor (3) with its front part being lowered is arranged in front of said heater conveyor (20), a stopper (4) is projected at a lower end of said roller conveyor (3) and the packed products fed out from the heater conveyor (20) are temporarily stopped on the roller conveyor (3).

Below said roller conveyor (3) is arranged a scaling unit (5) to cause said roller conveyor (3) to act as a scaling pan so as to scale the packed products which are temporarily stopped on said conveyor (3).

At the right side of said roller conveyor (3) are cooperatively arranged a feeding-out passage member (6) and a first discharging conveyor (7) in the same inclination angle as that of the roller conveyor (3), and a first stopper (3) and a second stopper (9) which are in continuous with the stopper (4), respectively, are projected to form a feeding-out passage (10).

Said feeding-out passage member (6) is a member for communicating the roller conveyor (3) with the first discharging conveyor (7) which may be of a mere planar plate. However, the products may be fed out more smoothly if the feeding-out passage member is of a roller conveyor which is arranged to cross with the roller conveyor (3) in a perpendicular direction thereto.

Said first discharging conveyor (7) may be swivelled at its lower end and its inlet side may be inclined more downwardly than the remainder.

There is arranged a second discharging conveyor (11) which is continuous with the first discharging conveyor (7) and extends to the inlet side of the automatic packing machine (1) with its inlet side being inclined when the inlet side of said conveyor (7) is inclined downwardly.

Then, the discharging means will be described, wherein at first two separate upper and lower sprockets (12) are rotatably arranged in parallel at both front right and left sides of the feeding-out passage (10) which is formed by said roller conveyor (3), feeding-out passage member (6) and the first discharging conveyor (7), and a chain (13) is wound around the sprockets to show a parallel line with the feeding-out passage (10).

Said chain (13) is provided with two equally spaced apart L-shaped holding means (14) and each of them is further provided with a pusher (15).

Guide walls (16) are arranged in parallel at the feeding-out passage (10) of the chain (13) and when the chain (13) is rotated along a feeding-out direction, the pushers (15) support the holding means (14) while they are moved at the feeding-out passage (10) and project therefrom to feed out the packed products.

Above the feeding out passage member (6) is arranged a labeling unit (17) in parallel with the feeding-out passage member (6), a weight of the products scaled by the scaling unit (5) is fed, any data such as a unit price, and a name of product etc. are fed, a label having a name of product, date, weight, price, unit price and code etc. printed thereon is issued and then adhered to the packed products transmitted onto the feeding-out passage member (6).

Thus, an operation of the above-mentioned device will be described, wherein the packed products to be fed out from the heater conveyor (20) are obtained against the lower stopper (4) due to an inclination of the roller conveyor (3).

After a weight stable signal is sensed and a scaling is completed by the scaling unit (5), the pushers (15) are operated to transmit the packed products to the feeding-out passage member (6) and then a label issued by the label printer (17) is adhered to the products.

Upon movement of the packed products onto the first discharging conveyor (7), the inlet side of said conveyor (7) is oscillated downwardly and thereby the packed products are fed out onto the second feeding-out conveyor (11).

Said labeling unit may be arranged at any sides of the feeding-out passage (10) and may be arranged over the roller conveyor (3) or the first discharging conveyor (7).

Near the labeling unit is arranged a sensor for detecting that the packed products are fed out, and a label is adhered by the labeling unit in response to the sensed signal of said sensor, thereby a label may be adhered to the products in a timely good relation therewith.

The labeling operation may be performed even if the packed products are being transmitted, and a higher accuracy of labeling position may be obtained if they are stopped temporarily.

Then, a modified form of the present invention will be described in reference to FIGS. 5 to 9, wherein the same or similar component elements as those described above are indicated by the same number and so their description will be eliminated.

In front of the automatic packing machine is assembled a scaling and labeling unit (2) in such a way as it may be moved to or away therefrom, said scaling and labeling unit (2') is constructed such that at first the belt conveyor (8') having pushers (9') projected therefrom is arranged over the heater conveyor (20) so as to form a transmitting means for transferring the packed products forwardly.

In front of the heater conveyor (20) is arranged horizontally a scaling pan (3') provided with a scaling unit (5), the packed products are carried on the scaling pan, stopped temporarily thereon and then scaled there.

At the right side of the scaling pan (3') are arranged horizontally in a cooperative relation a feeding-out passage member (6') and a first discharging conveyor (7') so as to form a discharging passage (10'), and a plurality of feeding-out conveyors (13') are arranged to extend over the scaling pan (3') and the feeding-out passage member (6') so as to form a feeding-out means.

The feeding-out conveyor (13') is a belt conveyor, two pushers (15') are equally spaced apart and projected in the belt, and when the belt is rotated along its feeding direction, the packed products are pushed thereby and transferred.

Said first discharging conveyor (7') is constructed such that it may be oscillated around its front end and its inlet side may be formed to show a low inclined attitude.

When the inlet side of the first discharging conveyor (7') is inclined downwardly, a second discharging conveyor (11) which is continuous with said conveyor (7') and extends up to the inlet side of the automatic packing machine in an inclined form is arranged.

Above the feeding-out passage member (6') is arranged a label printer (17) in parallel therewith.

In operation of the above-mentioned modification, the belt conveyor (8') is operated such that the packed products fed out by the heater conveyor (20) are pushed by the pushers (9'), carried on the scaling pan (3') at its desired place and stopped temporarily there, and at the same time the belt conveyor (8') is reversed slightly to cause the pushers (9') to be moved away from the packed products.

After the packed products are scaled by the scaling mechanism (5), the packed products are transferred to the feeding-out passage member (6') under an operation of the pushers (15') and then a label issued by the labeling unit (17) is adhered to them.

When the packed products are moved onto the first discharging conveyor (7'), an inlet side of said conveyor (7') is oscillated downwardly to cause the packed products to be fed out onto the second discharging conveyor (11).

The feeding-out means of the above-mentioned modification is arranged over the feeding-out passage and is not projected forwardly as found in case of the standard form of the device of the present invention, resulting in that a size of depth of the device can be reduced more than that of the former.

Since any one of the above-mentioned feeding-out means is of a conveyor which is rotated in one direction, an equal transferring efficiency can be obtained even if the transferring speed is half of that of the conventional type of the feeding-out means which is reciprocated.

The above-mentioned scaling and labeling unit (2) or (2') is not restricted to one which may be assembled to the packing machine in such a way as it may be moved to or away from the machine, but may be of one in which the scaling and labeling unit is of one piece of unit and fastened to the packing machine by bolts.

The packing machine may not be restricted to a full-automatic one, but may be a semi-automatic one in which only a barrel winding is manually performed.

In the figures, the packed products are defined to be fed out in a rightward direction of the packing machine, but it is optional to set a leftward feeding of the packed products.

FIGS. 10 to 14 relate to such a preferred embodiment as accomplishing said second described object, wherein it is improved in such a way as two or more packed products are not fed onto the scaling unit from the transferring passage in the packing machine.

In the figures, (1) is a packing machine, (22) is a scaling and labeling device, and the packing machine (1) is of the same arrangement as that of the above-mentioned preferred embodiment, so that they are identified with the same numerals and not described more.

In front of the transferring conveyor (20) of the packing machine (1) is arranged a first roller conveyor (24) with its front end being inclined downwardly and a discharging wall (27) having rollers freely rotated therein is arranged near a front end of said conveyor in such a way as it may be raised or descended. Below the first roller conveyor (24) is arranged a scaling unit (not shown) so as to scale the packed products carried on said conveyor (24).

Further, the second roller conveyor (25) is cooperatively arranged with the first roller conveyor (24) to form a feeding-out passage and at the same time over the second roller conveyor (25) is arranged a labeling unit (29) to adhere the label to the packed products which are being transferred.

Over said first and second roller conveyors (24) and (25) are arranged in tension the feeding-out conveyors (26) and (26), and pushers (26') and (26') pushing the packed products are integrally formed to the surface of said conveyor to cause the packed products to be transferred from the first roller conveyor (24) to the second roller conveyor (25). Reference numeral (30) indicates a discharging conveyor which is arranged at a terminal end of the second roller conveyor (25) and is constructed such that the above-mentioned first discharging conveyor (7) or (7') and the second discharging conveyor (11) are integrally connected.

(28) and (28) in the figures indicate a sensor which is composed of a light emitting unit and a light receiving unit the sensor being arranged at an interface between the feeding conveyor (20) and the first roller conveyor (24) to assure a feeding-in of the packed products into the first roller conveyor (24).

The discharging wall (27) is arranged in order to discharge the packed products when they are fed irregularly, and when said discharging wall (27) is fallen by the output of the sensor for sensing an irregular feeding-in, all the packed products on the first roller conveyor (24) are discharged.

Figure 12:
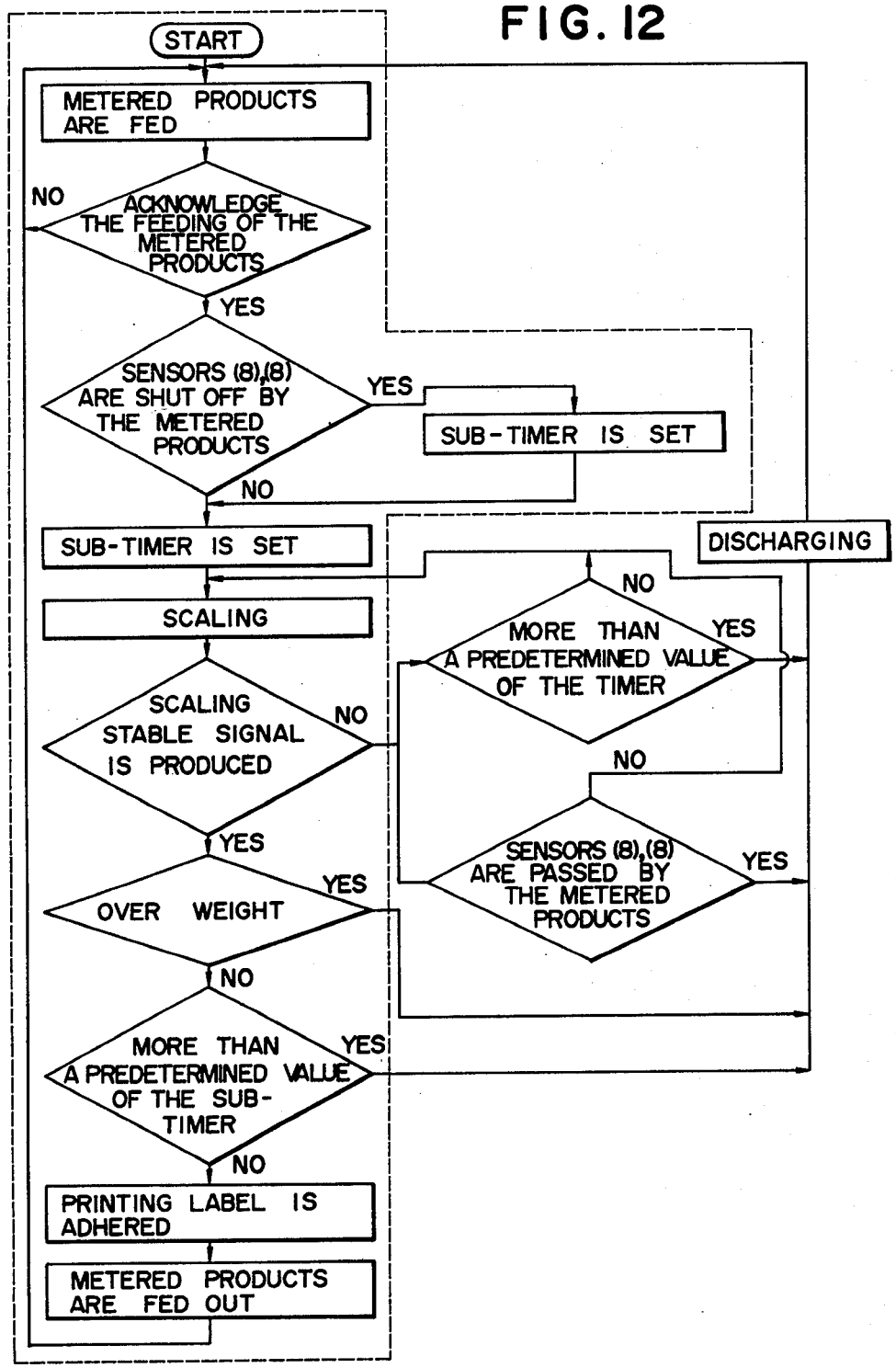
FIG. 12 is a flow chart of a control system.

In reference to FIG. 12, a control of said packing machine (1) and a scaling and labeling device (22) will be described in respect to its flow chart, wherein the items enclosed in the dotted and dashed line frame indicate a standard cycle and the other items out of the frame are the case in which irregular feeding-in of the packed products is performed.

In case of the standard cycle, at first the packed products are fed into the packing machine (1) to perform a packing operation, the products are fed out by the feeding-out conveyor (20) and then they are fed into the first roller conveyor (24).

In the sensors (28) and (28), the light is shut off by the packed products to assure or acknowledge a feeding-in of the packed products and this is fed to the control circuit (not shown).

Timer is cooperatively related to said control circuit, the timer is set to count the time when the scaling is started, i.e. a feeding-in of the packed products is acknowledged by the sensors (28) and (28).

Counting may also be performed when a load more than a specified value is applied to the scaling unit other than that when said starting operation is performed.

The packed products are scaled by the scaling unit arranged in the first roller conveyor (24) and when the scaling stable signal is produced, a price and name of product are printed in the label by the labeling unit (29).

Then, the feeding-out conveyors (26) and (26) are driven to cause the packed products to be transported onto the second roller conveyor (25) by the first roller conveyor and when they are reached just below the labeling unit (29), a label is adhered to the products by the labeling unit (29) and then the packed products are fed out by the discharging conveyor (30). Repetitive operation of the above-mentioned steps is defined as a standard cycle.

The case in which the irregular feeding-in of the packed products is performed will be described.

When a limiter is connected to the scaling unit and a maximum weight of the packed products is set as a limiting value, for example, all the outputs of the scaling unit exceeding said limiting value show that a plurality of packed products are carried on the scaling unit. That is, said limiter becomes a sensor for use in sensing that a plurality of packed products are fed into the scaling unit. When a scaling stable signal is produced during a standard cycle and the limiter shows a value more than the specified value, i.e. when the packed products show an excessive weight in which a plurality of said packed products are carried on the first roller conveyor, the discharging wall (27) is fallen to discharge the packed products.

The case in which the timer is used as a sensor will be described, wherein said timer is set by the standard scaling time, and when the timer counts down longer than said standard scaling time, the discharging wall (27) is fallen to return to the standard cycle.

Counting is continued if the time is within the standard scaling time and in turn when the feeding-in of the subsequent packed product is sensed by the sensors 928) and (28), the discharging wall (27) is fallen to perform a discharging operation even before the scaling stable signal is produced.

Setting of the above-mentioned standard time in the timer is performed as follows, e.g.

(1) a standard scaling time setting circuit is provided to set the time;
(2) a key in the console is struck to set the time; and
(3) an interval of feeding-in of the product from the packing machine (1) is read by the sensors (8) and (8) and set thereby etc.

The case of irregular feeding-in of the product in which the packed products are carried on the scaling pan and a first roller conveyor (24) of the preferred embodiment to be projected therefrom will be described, wherein the products, when they are projected from the first roller conveyor (24), shut off the light from the sensors (28) and (28). The time in which the light is shut off is counted by the sub-timer etc. The longest time of passing of the packed products is set in the sub-timer and when the time longer than said passing time is counted by the timer, the discharging wall (27) is fallen.

The above-mentioned preferred embodiment is constructed to show a mere discharging of the packed products, and this may be constructed such that irregularily fed-in products are gathered through a by-passing path.

In the preferred embodiment, the roller conveyors of the first and second roller conveyors (24) and (25) are arranged in an inclined form, but they may be arranged horizontally, a discharging method is also not restricted to that of the preferred embodiment, and the roller conveyor itself may be rotated by a motor or the like to perform a forced discharging of the products.

Better result may be obtained by displaying the irregular feeding-in of the products on the console unit and their abnormal condition may be acknowledged by an error display unit, warning lamp illuminated and alarm buzzer etc.

Figure 13:
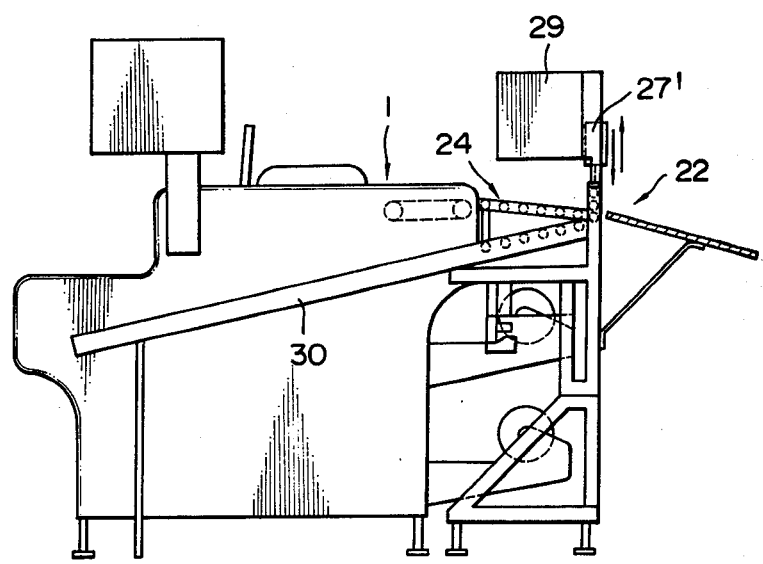
FIG. 13 is a front elevational view for illustrating a modification of a discharging means.
Figure 14:
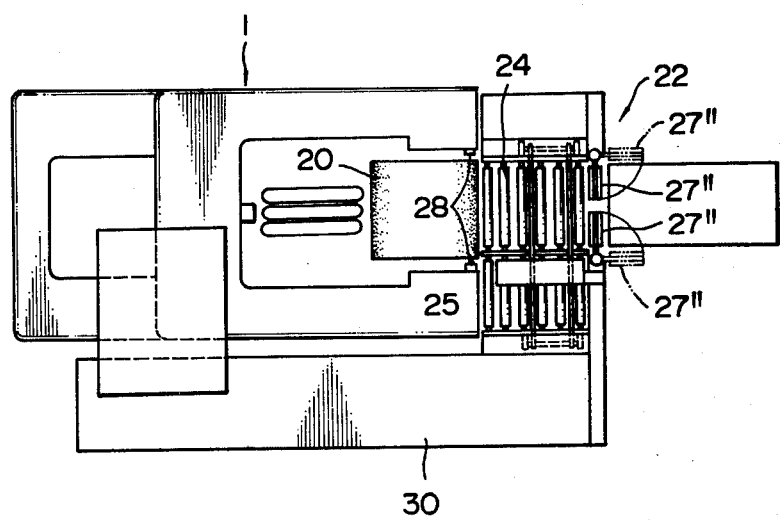
FIG. 14 is a top plan view for illustrating another modified discharging means.

FIGS. 13 and 14 illustrate a modification of the discharging means, wherein (27') indicates a discharging shutter which may be slid vertically to open and close. (27") indicates a discharging door which may be opened widely.

Further, a place where the discharging mechanism is arranged is not restricted to that described above, but may be arranged at a side part opposite to the second roller conveyor (25) of the first roller conveyor (24), for example.

FIGS. 15 to 22 illustrate another preferred embodiment for accomplishing the still further object of the present invention which relates to an improvement of the roller conveyor constituting the above-mentioned scaling pan.

Figure 15:
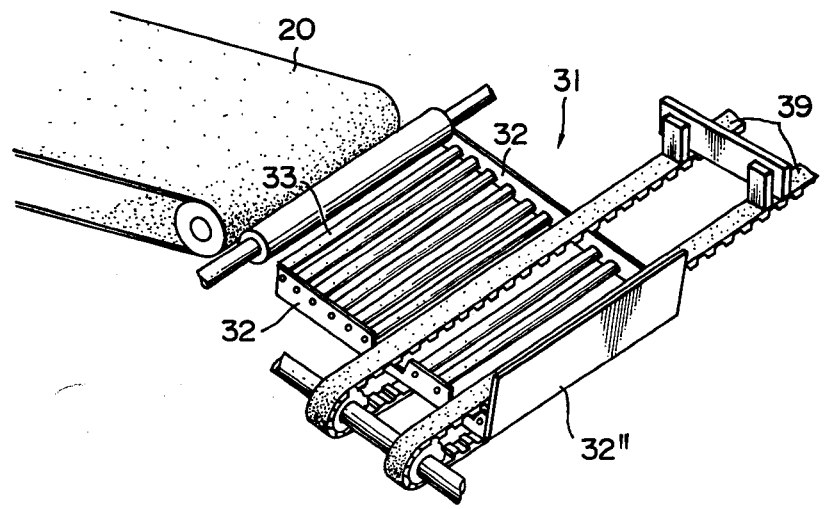
FIG. 15 is a perspective view for illustrating a scaling unit of the present invention.
Figure 16:
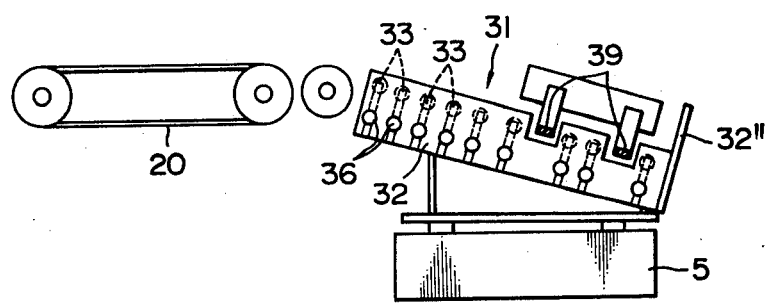
FIG. 16 is a front elevational view of FIG. 15.

In FIGS. 15 and 16, (20) indicates a transferring conveyor of a packing machine, (5) is a scaling unit, (31) is a roller conveyor and (39) is a feeding-out conveyor provided with pushers. The roller conveyor (31) is constructed such that rollers (33) and (33) are rotatably arranged in parallel against the side plates (32) and (32) arranged in parallel to each other, and said roller conveyor (31) is inclined and a guide plate (32") is raised at the lower end of the roller conveyor. On the roller conveyor (31) are fed some packed products from on the transferring conveyor (20).

Figure 17:
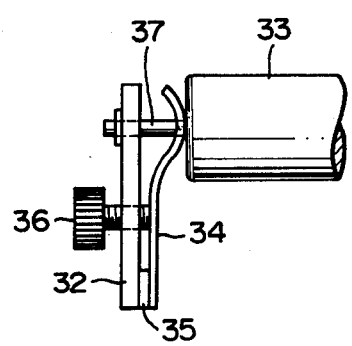
FIG. 17 is a partial side elevational view.

In reference to FIG. 17, a braking device arranged at one end of each of the rollers (33) will be described. At first, one end of the leaf spring (34) is fixed below the roller (33) through the fixing plate (35), upper end of the leaf spring (34) is formed to show a fork shape and abutted against the end surface of the roller (33) without being contacted to the pivot shaft (37) of the roller (33).

Then, a bolt (36) passing through the side plate (32) is arranged to press against the center part of the leaf spring (34). Fastening of said bolt (36) enforces a force abutting against the roller (33) of the leaf spring (34), and a loosening of the bolt (36) weakens a force abutting against the roller (33) of the leaf spring (34), thereby a braking force may be adjusted.

In the above-mentioned preferred embodiment, all the rollers are provided with the braking mechanisms and they may be applied only to a certain roller. The braking force for each of the rollers is not necessarily uniformed, but the larger the braking force, the lower the position of the roller so as to decrease the shock abutting against the guide plate.

Figure 18:
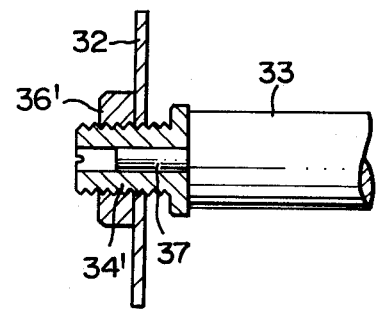
FIGS. 18 to 22 are a partial enlarged view for illustrating a modification of a control mechanism.

Then, a modification of the braking mechanism will be described in reference to FIG. 18, wherein (34") indicates a bearing formed of a synthetic resin to carry the pivoted shaft (37) and at the same time abut against the end surface of the roller (33).

At the outer circumference of said bearing (34') is formed a male thread fitted to a female thread formed in the side plate (32), a fastening of the bearing (34') may enforce the braking force and in turn its loosening may weaken the braking force. Further, the nut (36') is applied for preventing the bearing (34') from being loosened and this is to be fastened after an adjustment of the braking force.

Figure 19:
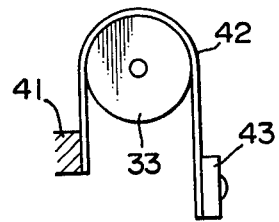

FIG. 19 illustrates still further modification of the present invention, wherein (41) is a fixing member which is projected from the inner surface of the side plate (32) to the roller (33), one end of the lining belt (42) is fixed thereto, said lining belt (42) is extended over and through the roller (33) to support the load (43).

Since a braking force of said preferred embodiment is defined by a tension force of the lining belt (42), it may be adjusted in response to a degree or value of the load (43).

Figure 20:
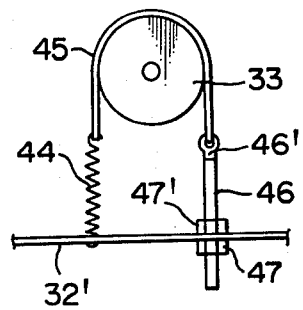

FIG. 20 illustrates still further modification, wherein at first a lining belt (45) is arranged at a bottom plate (32') of the roller conveyor (31) through a spring (44) and connected to a bolt head (46') through passing over the roller (33).

The bolt head (46') is rotatably arranged in a bolt (46), said bolt (46) is passed through the bottom plate (32') and fastened to the nuts (47) and (47') with the bottom plate (32') being held therebetween.

That is, the above-mentioned fourth preferred embodiment is constructed such that the nut (47') is rotated to loosen the bolt and the nut (47) is rotated to feed-in or feed-out the bolt (46), thereby the braking force is adjusted and a position of the bolt (46) is fixed.

In reference to FIG. 21, a still further modification of the present invention will be described, wherein a leaf spring (48) abutting against in a semi-circular form the lower surfaces of the rollers (33) and (33) is arranged below the rollers (33) and (33), a bolt (49) is passed through the bottom surface (32') to support a center part of the leaf spring (48).

Figure 21:
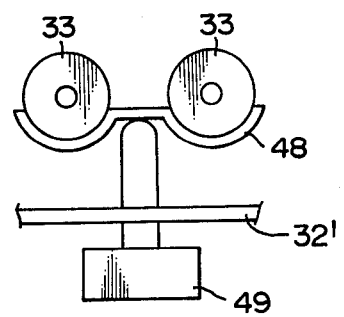

In FIG. 21, a rotation of the bolt (49) causes the abutting force between the leaf spring (48) and the rollers (33) to be adjusted as well as a braking force is adjusted thereby.

Figure 22:
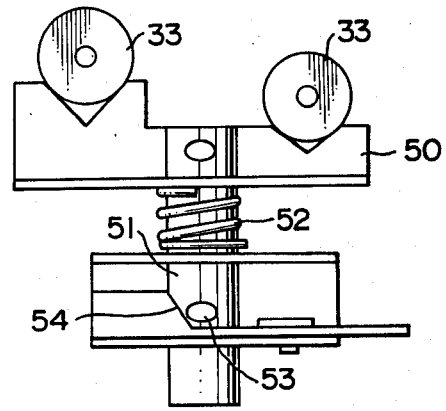

Modification of the present invention shown in FIG. 21 will be described in reference to FIG. 22, wherein this is the case in which the rollers (33) and (33) are arranged in a stepped form, a pushing member (50) formed with V-grooves is installed in reference to the height of the rollers (33) and (33), and the bar (51) is arranged below the pushing member to support the same.

At an outer circumference of said bar (51) fitted a coil A spring (52) and below the bar (51) is arranged a pin (53). braking force adjusting member (54) is provided with a slant surface abutting against the pin (53) and a braking force can be increased by moving said member (54) in a rightward direction as viewed in the figure.

In FIGS. 15 and 16, there are arranged a braking mechanism for braking a rotation of the rollers (33) and an adjusting mechanism for adjusting a braking force of said mechanism, thereby it is possible to adjust a proper transferring speed without falling the packed products and fast running of the products and at the same time each of the rollers braked is rotated slightly without fail, so that no eccentric reduction of the roller is found and the roller shows a better durability.

FIGS. 23 to 28 illustrate an improvement of the arrangement for accomplishing the still further object of the present invention.

That is, the packed product to be fed into the scaling unit has as its kind one having a disturbance in its weight and requiring a scaling thereof (a rated product) and the other one having no disturbance in its weight, for example, a meat ball, and requiring no scaling (a non-rated product).

In case of the rated product, although it is not necessary to use any scaling unit due to the fact that its weight and/or price data are fed at said input operating unit during data setting operation, a utilization of the transferring system as found in the above-mentioned preferred embodiment may cause the scaling unit to operate and generate some errors in the label printing data, no movement of the product is performed until the scaling completion signal or scaling stable signal is produced, and thus a high speed of operation may not be expected. In reference to this fact, the present invention may overcome the disadvantage described above.

Figure 23:
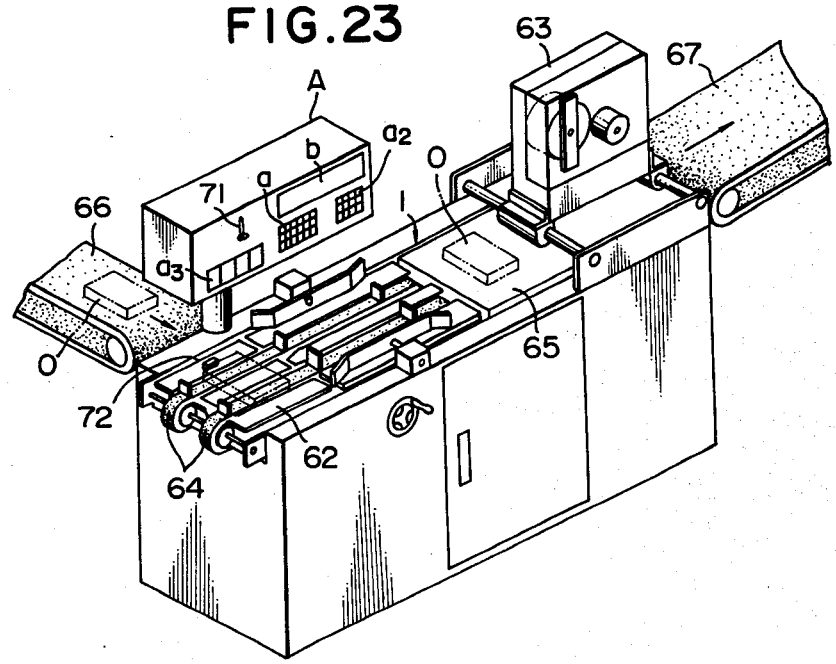
FIG. 23 is a perspective view for illustrating another preferred embodiment of the present invention.

In FIG. 23, (61) is a product feeding-out passage, (62) is a scaling unit, (63) is a labeling unit and (A) is a console unit storing a central processing unit (CPU). The product feeding-out passage (61) is a passage for use in transferring the packed product (0) from the scaling unit (62) to the labeling unit (63), the transferring means uses at its half part of the scaling unit (62) a conveyor (64) with pushers as shown and at its other half part of the labeling unit (63) a belt conveyor (65). In the figure, (66) is a transferring passage of a packing machine and (67) is a discharging passage.

The scaling unit (62) scales the weight of the product (0) and feeds the weight data of said product to the central processing unit (CPU) of the console (A) and at the same time feeds out either a scaling stable signal or scaling completion signal (P) at a specified time in the scaling operation.

The console (A) stores the central processing unit (CPU) and has an input operation unit (a) and a display unit (b) which are connected to the unit (CPU), wherein the input operation unit (a) produces data relating to the product (0), for example, a unit price, a gross weight, product name code number, bar code number, and an effective data etc. to the central processing unit (CPU) under an operation of the keys such as a preset key ($a_1$), a set number key (ten key)($a_2$) and instruction key ($a_3$).

The central processing unit (CPU) stores and hold the desired product data transmitted from the input operation part (a), calculates and processes the price data in reference to the weight data transmitted from the scaling unit (62), transmits the required data to the display unit (b) and the labeling unit (3) along with the display signal ($Q_1$) and the printing signal ($Q_2$), causes the display unit (b) to display data when said scaling stable signal or scaling completion signal (P) is fed out, and further causes the labeling unit (63) to initiate a label issuing operation.

The central processing unit (CPU) produces the product transferring signal ($Q_3$) when either said scaling stable signal or a scaling completion signal (P) is fed out, energizes the driving motor for said conveyor (4) with pushers and thereby moves the products (0) on the scaling unit (62) by the conveyor (64) toward the conveyor (65).

Said conveyor (65) feeds the product (0) accepted from the conveyor (64) below the labeling unit (63), and then the labeling unit (63) blows and adheres said issued label to the upper surface of the product (0) when the products (0) reached the desired position.

It is optional to determine the timing when said central processing unit (CPU) produces the display signal ($Q_1$), printing signal ($Q_2$) and product transferring signal ($Q_3$) by setting it just after the scaling stable signal or the scaling completion signal (P) is fed in or at the time delayed by a specified amount of time.

The above-mentioned arrangement is for one in which the products (0) are a non-rated product and the scaling and labeling operation is performed therefor, and if the rated product is to be processed by the above-mentioned arrangement, the following arrangement is required.

That is, the above-mentioned central processing unit (CPU) is provided with a discriminating circuit (70) for judging that the product (10) is a rated product, that is, the product is one which does not require any scaling thereof, the discriminating circuit being connected to the central processing unit.

Figure 24:
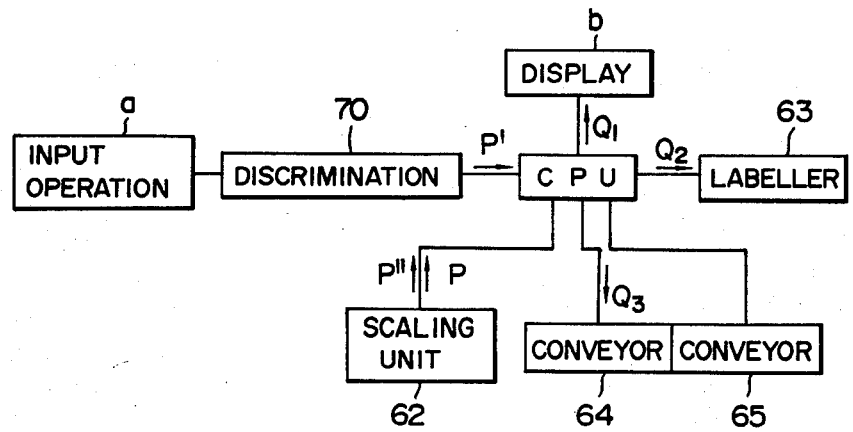
FIG. 24 is a block diagram of the present invention.

(1) Discriminating circuit (70) is arranged between the input operation part (a) and the central processing unit (CPU) (FIG. 24).

The discriminating circuit (70) judges that the product is a rated one in response to the kind of data fed into the central processing unit (CPU) by the input operation part (a).

For example, in case of the non-rated product, the unit price data are necessarily fed by the instruction key ($a_3$) and the set number key ($a_2$) of the input operation part (a) and in case of the rated product, said unit price data are not fed in.

Therefore, the central processing unit may judge the product as a rated one when no unit price data are fed to the input data.

A changing-over switch (71) for a non-rated product and a rated product is arranged at the input operation part (a), said switch (71) is turned on to the rated product and then the discriminating unit (70) judges that the product is a rated one.

Said discriminating part (70) is operated such that the sensed signal (P') is fed to the central processing unit (CPU) when the rated product is judeged in response to the input data or the changing-over switch (71).

The central processing unit (CPU) having said sensed signal (P') fed therein produces both the product transmitting signal ($Q_3$) and the display signal ($Q_1$) as well as a printing signal ($Q_2$) when the unit judges that the product (0) is placed on the scaling unit (62).

That is, the central processing unit (CPU) having the sensed signal (P') produces each of said signals ($Q_1$), ($Q_2$) and ($Q_3$) in preference to the scaling stable signal or the scaling completion signal (P) when the product (10) is placed on the scaling unit (62).

The discriminating means for judging a presence or absence of the product on said scaling unit (62) produces the sensing signal (P'') when the scaling unit (62) measures a weight more than a desired low weight (for example, 20$d$) or when the product sensor unit (72) is mounted on the scaling unit (62) (FIG. 23) and a presence of the product (10) is sensed by said sensor (72).

Therefore, the central processing unit (CPU) accepts said sensed signal (P') from the input operation unit (a) and stores it when the signal is produced, then the CPU produces said signals ($Q_1$), ($Q_2$) and ($Q_3$) each time the sensed signal (P'') is fed therein.

Figure 25:
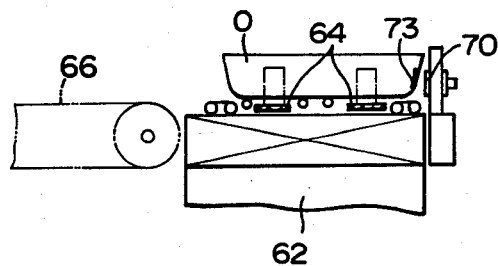
FIG. 25 is a sectional view for illustrating a modification of a discriminating unit.
Figure 26:
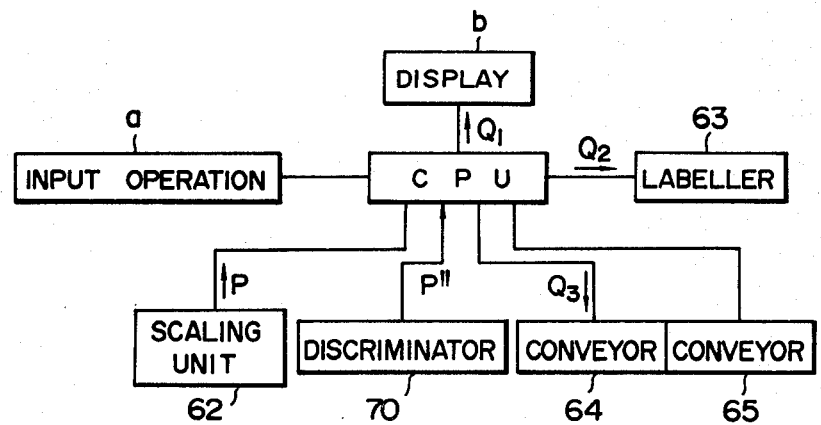
FIG. 26 is a block diagram of a modification of FIG. 24.

(2) Discriminating unit (70) is mounted near the scaling unit (62) (FIGS. 25 and 26).

The discriminating unit (70) is an optical sensor, for example, a light sensor or a colour sensor etc. and is operated such that the product (0) or its packaging material is provided with a sensing mark (73) such as a symbol or a classified colour etc. enabling the rated product to distinguish from the non-rated product, and the sensed signal (P'') is produced to the central processing unit (CPU) when the discriminating unit (70) senses said mark (73).

In the second form of the discrimination (2) above, since a presence or non-presence of the product may simultaneously be discriminated by the discriminating unit (70), the central processing unit (CPU) produces said signals ($Q_1$), ($Q_2$) and ($Q_3$) each time only the input of said sensed signal (P''') is found.

Thus, when the product (0) is automatically fed onto the scaling unit (62) and the rated product is not sensed by the discriminating unit (70) (the signals P', P'' or P''' are not produced), the product (O) is transferred by the conveyor (64) after the scaling unit (62) has completed its desired scaling operation for the product applied as a normal non-rated one and then a label is adhered to the product by the labeling unit (63) while the product is being transferred on the conveyor (65). Then, since the central processing unit (CPU) produces the signals ($Q_1$), ($Q_2$) and ($Q_3$) when the product is sensed as a rated one by the discriminating unit (70) (the signals P', P'' or P''' are produced), the rated product on the scaling unit (62) starts to move from on the scaling unit (62) by the conveyor (64) without performing any desired scaling operation in response to the transferring signal ($Q_3$) and at the same time the labeling unit (63) initiates a label issuing operation in response to the printing signal ($Q_2$) and then a labeling operation is performed while said product is being moved on the conveyor (65).

Figure 27:
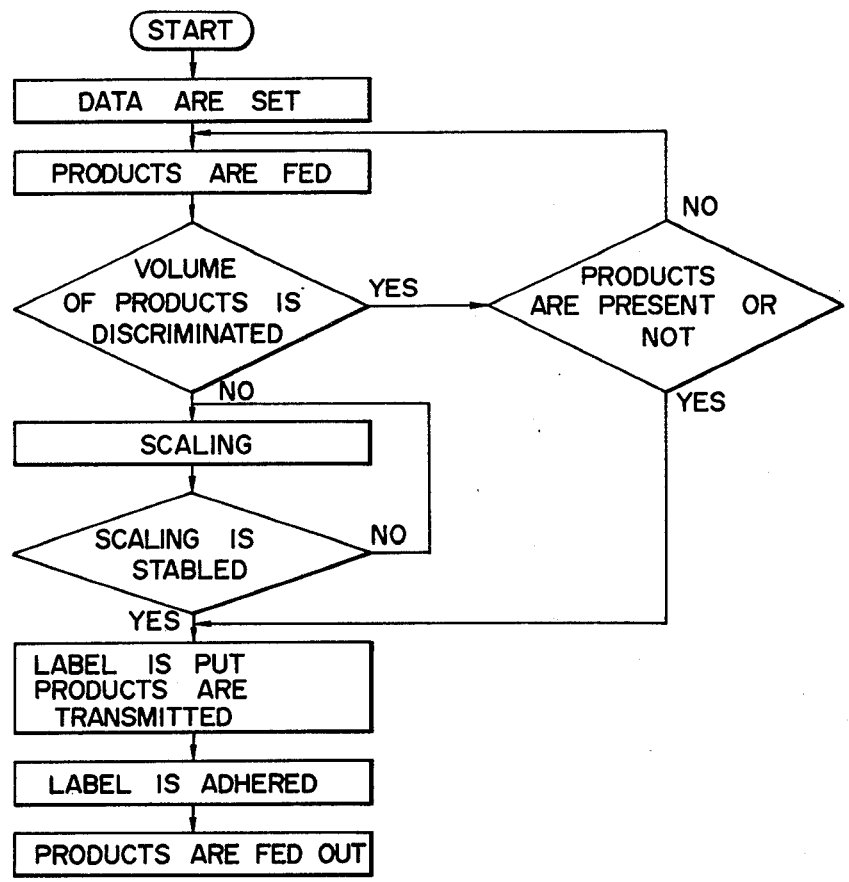
FIG. 27 is a flow chart.
Figure 28:
FIG. 28 is a block diagram of arrangement.

Said working operation is indicated in the flow chart of FIG. 27.

FIGS. 29 to 32 illustrate a preferred embodiment for performing the still further object of the present invention, wherein the embodiment relates to an improvement for making an initial load for the scaling unit minimum.

Figure 29:
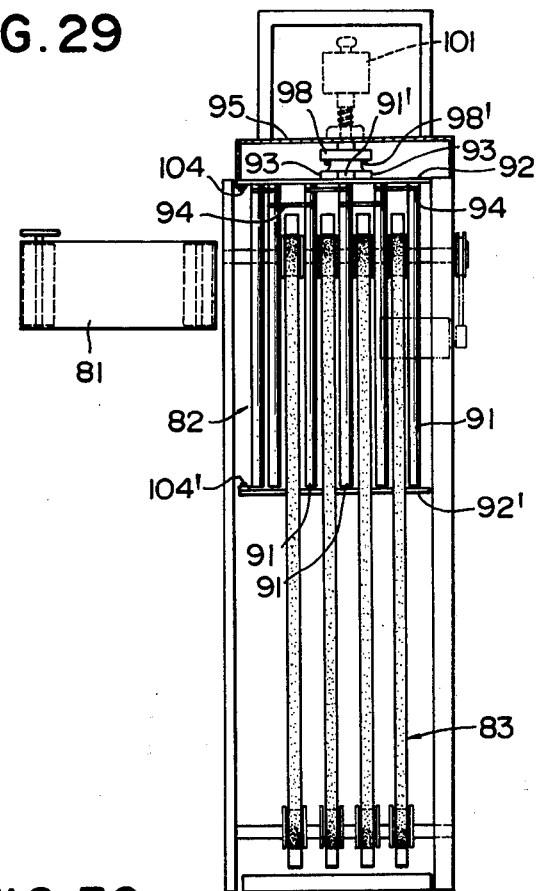
FIG. 29 is a top plan view of another preferred embodiment of the present invention.
Figure 30:
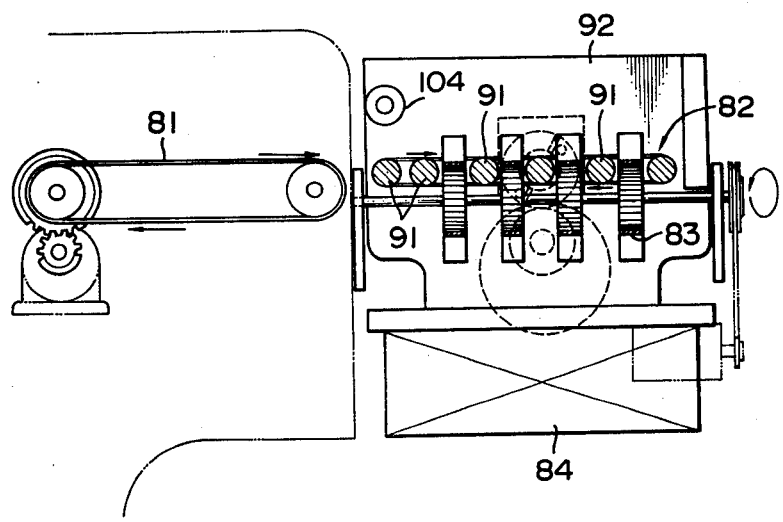
FIG. 30 is an enlarged sectional view of FIG. 29.

In FIG. 29, (81) indicates a belt conveyor forming a transferring passage for the packing machine, (82) is a roller conveyor, (83) is a feeding-out conveyor having pushers and (84) indicates a scaling unit. Bearings (92) and (92') are raised on said scaling unit (84) in a lateral spaced apart relation, rollers (91) and (91) . . . are rotatably arranged between the bearings (92) and (92') in a horizontally spaced apart relation so as to form said roller conveyor (82), said conveyor (82) being operated to act as a scaling pan for the scaling unit (84).

The roller conveyor (82) is constructed such that said rollers (91)(91) . . . are arranged in a substantially planer relation with the transferring plane of the belt conveyor (81), and the bearings (92) and (92') are rotatably arranged thereon, one of the rollers (91) is projected outwardly from the bearing (92) and a driven shaft (91') is arranged at said projected part in integral with the roller (91). The driven shaft (91') is provided with two engaging vanes (93) and (93) which are radially projected at its outer circumferential symmetrical position.

Each of the side parts of the rollers (91) and (91) is provided with the timing belts (94) and (94) . . . wound thereon at each of the adjacent rollers (91) and (91) in sequence and all the rollers (91) and (91) . . . are rotated in the same direction in synchronous with the rotation of one of the rollers (91).

At the outside of said bearing (92) is raised a supporting wall (95) in a spaced apart relation thereto, a main shaft (96) of the motor (M) is rotatably pivoted at the supporting wall (95), a movable shaft (9) is axially and slidably pivoted above the main shaft said shaft (97) being oppositely arranged in a concentric relation with the driven shaft (91') for said roller conveyor (82).

A clutch plate (98) having teeth at its outer circumference is rotatably arranged on said movable shaft (97) through a bearing (99), this clutch plate (98) is engaged with a driving gear (100) fixed to a main shaft (96) of the motor (M) and then the clutch plate (98) is rotated under an energization of the motor (M). At the front surface of the clutch plate (98) are projected two engaging pins (98') and (98') at their symmetrical positions and they are engaged with the engaging vanes (93) and (93) of said driven shaft (91') in a rotational direction.

Said movable shaft (97) in inserted in the supporting wall (95) and fitted thereto in such a way as the clutch plate (98) is moved to and away from the bearing (92) while it is being engaged and slid on the driving gear (100), a plunger (102) of the solenoid (101) is connected to the movable shaft (97) and the clutch plate (98) is projected toward the driven shaft along with the movable shaft (97) through the plunger (102) when said solenoid (101) is operated.

Figure 31:
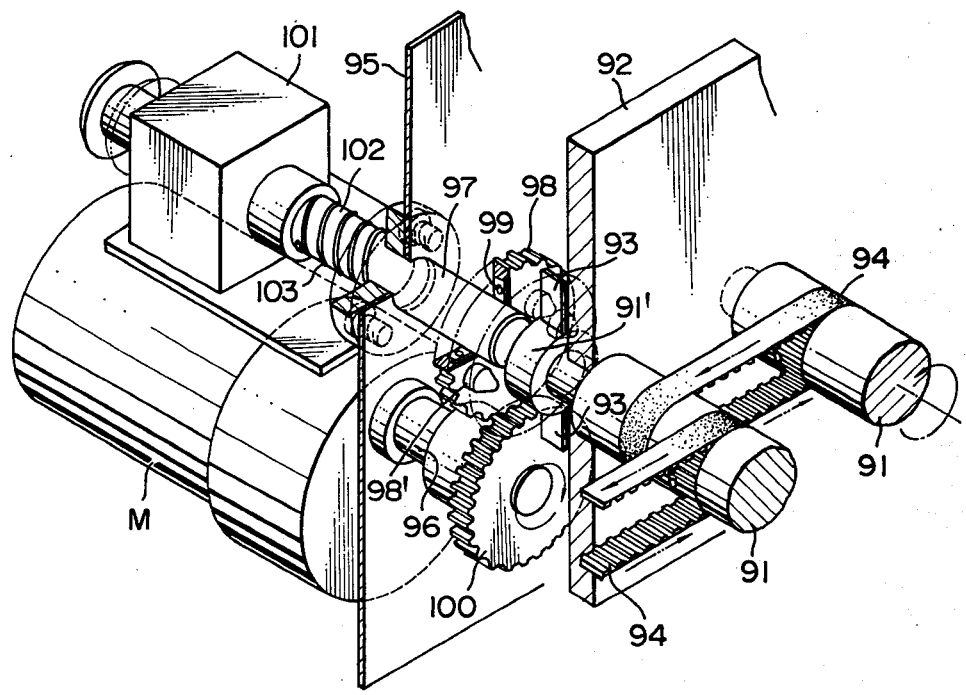
FIG. 31 is a perspective view in partly broken away for showing a rotational driving unit.
Figure 32:
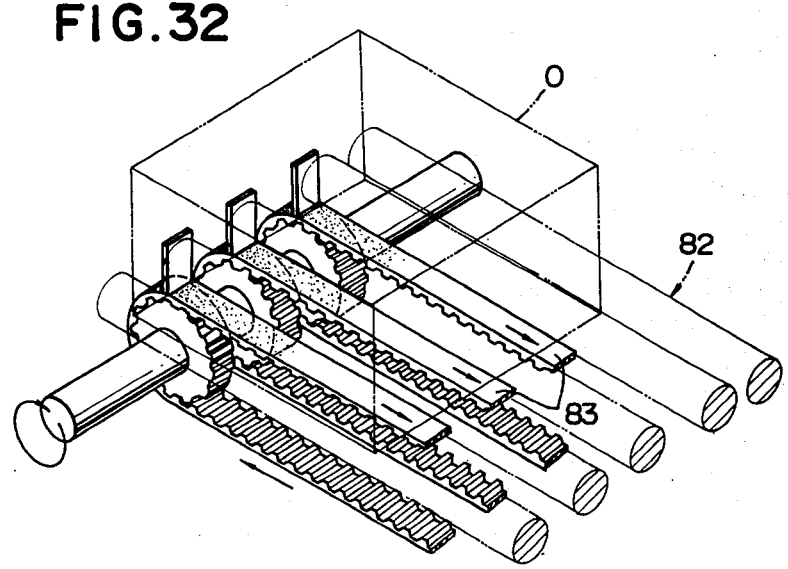
FIG. 32 is a partial perspective view for showing a feeding-out conveyor.

In FIG. 31, a reference numeral (103) indicates a returning spring for the projected plunger (102).

Thus, said clutch plate (98) is rotated when the motor (M) is energized and the plate is projected through a plunger (102) when the solenoid (101) is operated to cause the engaging pins (98') and (98') to be projected to the engaging vanes (93) and (93) of the driven axis (91'), the driven axis (91') is rotated through said vanes (93) and (93), thereby the rollers (91) are rotated and at the same time other rollers (91) and (91) . . . are also rotated through timing belts (94) and (94) . . ., that is, the roller conveyor (82) is energized. And then the clutch plate (98) is returned through a plunger (102) under a resilient force of the spring (103) when said solenoid (101) is deenergized, said engaging pins (98') and (98') are disengaged from the engaging vanes (93) and (93), so that said roller conveyor (82) is stopped.

A clutch mechanism is constructed by said movable shaft (97) clutch plate (98), engaging pin (98'), solenoid (101), plunger (102), spring (103), driven shaft (911) and engaging vanes (93)

The clutch mechanism is not restricted to the above-mentioned structure, but other structure, for example, a friction plate contact system and a roller contact system may be applied.

Operation timing of the roller conveyor (82) will be described as follows, wherein said solenoid (101) is always operated to cause the engaging pins (98') and (98') to be engaged with the engaging vanes (93) and (93), thereby the roller conveyor (82) is set to its driving condition, the packed product (O) transferred on the belt conveyor (81) is fed in onto the roller conveyor (82) and moved on the rollers (91) and (91). Reaching of said packed product (O) to the desired position on the conveyor (82) is sensed and said solenoid (101) is deenergized.

For example, a pair of photoelectric tubes (104) and (104') are mounted at a desired feeding-in position of said bearings (92) and (92'), a sensing signal is produced, when the rear end edge of the packed product (O) moved on the roller conveyor (82), by said devices (104) and (104') and then said solenoid (101) is deenergized.

Said photoelectric tube devices (104) and (104') are arranged at further desired positions and produce a sensing signal for deenergizing the solenoid (101) when the front edge of the packed product (O) moved on the roller conveyor (82) by said device is sensed.

The scaling unit (84) is operated to perform a scaling operation in cooperation with the roller conveyor when said solenoid (101) is deenergized and the roller conveyor is stopped.

Thus, when a scaling operation is performed by the scaling unit (84), the roller conveyor (82) is stopped and the packed product (O) is kept stopped and the engaging pins (98) and (98') of the clutch mechanism are kept disengaged from the scaling unit (84).

Therefore, the motor (M) and the main shaft (96) may be excluded from the initial load of the scaling unit (84).

In the example of the above-mentioned operation, the case in which the solenoid (100) is always operated to keep the roller conveyor (84) in an operated condition has been explained. However, in case of a normal operation, the solenoid (101) is set at its deenergized condition and when the reaching of the packed product (O) to the desired position on the belt conveyor (81) is sensed by the sensor, said solenoid (101) is operated to drive the roller conveyor (82) and at the same time a required time for the packed product (O) to reach to the desired position on the roller conveyor (82) is set by a timer, the solenoid (101) is deenergized to stop the roller conveyor (82).

Figure 33:
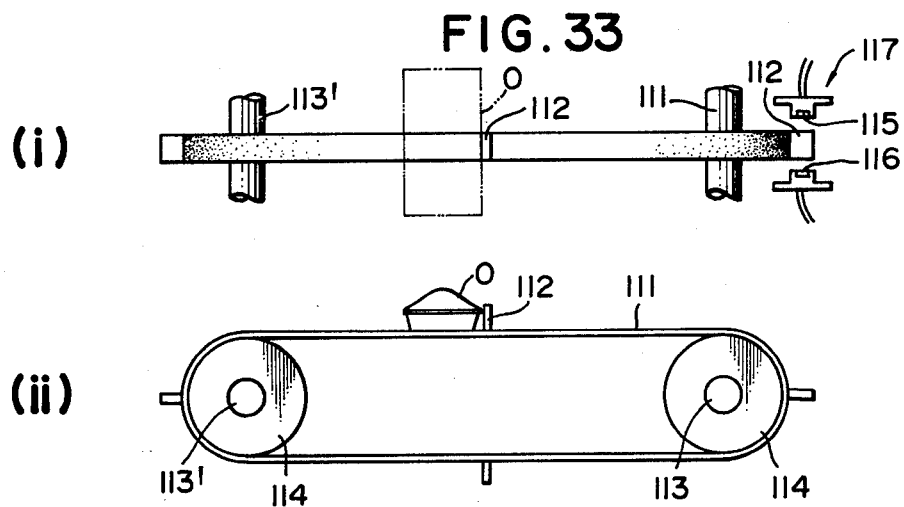
FIG. 33 is an overall diagramatic view for showing a position sensor means for a feeding-out conveyor, wherein (i) is a top plan view for showing a part of the conveyor and (ii) is a side elevational view of the conveyor.
Figure 34:
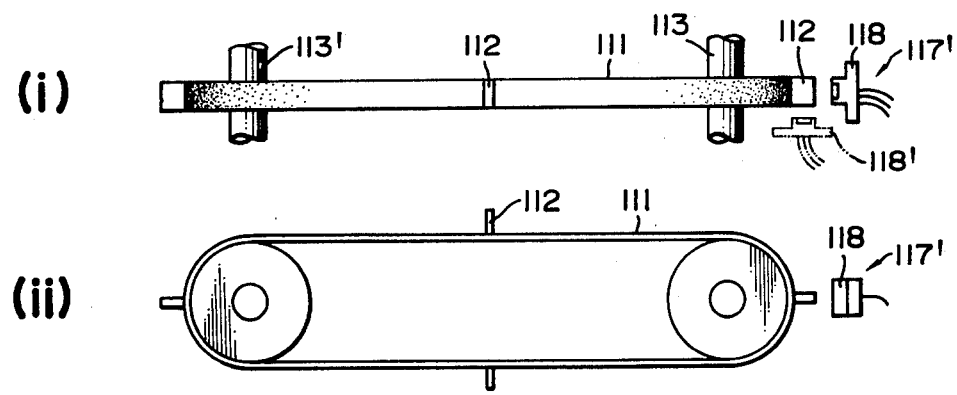
FIG. 34 and FIG. 35 are a top plan view and a side elevational view for showing a modification of the present invention shown in FIG. 33.
Figure 35:
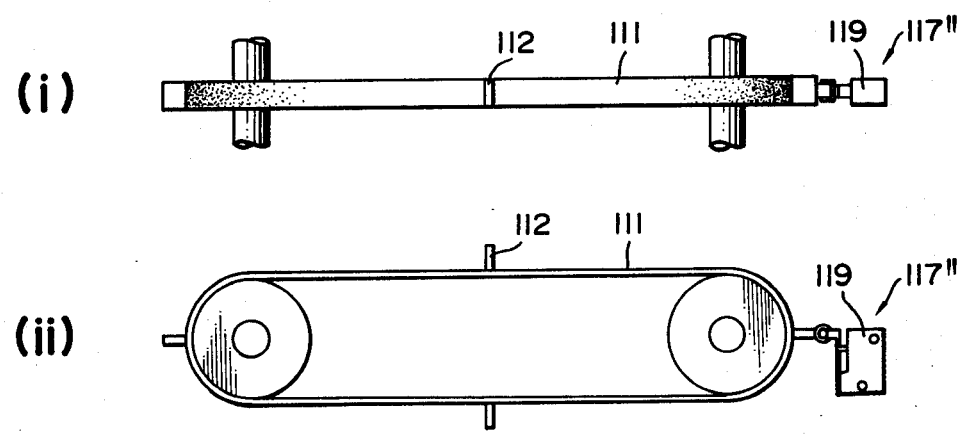

FIGS. 33 to 35 illustrate a preferred embodiment of the present invention to accomplish the still further object thereof, wherein it relates to a stopping position control for the belt conveyor with pushers constituting a feeding-out conveyor, there is provided a sensor unit operated when the pushers of the belt conveyor are approached and then the belt conveyor is stopped in response to the output signal of said sensor unit. FIG. 33 illustrates the case in which a shut-off type photoelectric switch is utilized as a sensor, wherein (111) indicates a belt conveyor constituting a feeding-out conveyor, (112) is a pusher, (113) indicates a driving shaft, (114) is a pulley, (115) is a light receiving element and (116) is a light emitting element.

The belt conveyor (111) is rotated through a driving shaft (113) by a driving force of the motor (not shown) which is started in response to a starting instruction signal such as a scaling completion signal of the scaling unit, and the pusher (112) is moved along with the rotation of the motor to cause the packed product (O) to be transferred.

Light receiving element (115) and the light emitting element (116) of the sensor (117) are mounted at the positions to hold the belt conveyor (111) therebetween, and when the pusher (112) mounted on the belt conveyor (111) approaches between said light receiving element (115) and the light emitting element (116) to shut off the light, the sensor (117) is operated and the sensor signal is produced. Driving source such as a motor driving the driving shaft (113) is terminated in response to the sensed signal to stop the belt conveyor (111).

The belt conveyor (111) is moved again and said operation is repeated by a feeding of the instruction signal to the motor. When started, even if the pusher (112) of the belt conveyor (111) is positioned between the light receiving element (115) and the light emitting element (116), a time of shutting-off of the light performed by the pusher (112) is changed to a signal through the differential signal circuit etc. at once, thereby the motor is started to operate. In this way, after the belt conveyor is stopped, the above-mentioned starting instruction signal is applied to cause the belt conveyor to be energized again and an intermittent transferring action can be performed.

FIG. 34 illustrates a modification of the present invention, wherein a reflection type switch (118) is utilized as a sensor (117). In this case, a part for use in sensing the position of the belt is an end surface of the extremity of the busher (112) and it is optional that the reflection type switch (118') is arranged at the side surface of the belt conveyor and the side surface of the pusher (112) may be used as a sensing part.

In order to improve an accuracy of sensing in the sensor unit (117'), a reflection means such as mirror may be adhered to the reflection surface.

FIG. 35 illustrates another modification of the present invention, wherein as a sensor unit (117") a mechanical switch (119) such as a micro switch etc. may be used.

The pusher (112) has been described in reference to its means integrally formed with the belt conveyor (111) and it is optional that the separate pusher may be fixed by screws or adhesive agent etc.

FIGS. 36 to 51 illustrate a preferred embodiment for accomplishing a still further object of the present invention, wherein it relates to a reinforcement structure for a pusher which is applied in the belt conveyor with pushers constituting a feeding-out conveyor.

Figure 36:
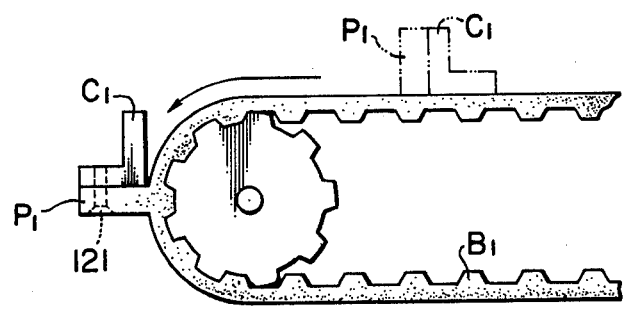
FIG. 36 is a side elevational view for illustrating another preferred embodiment of the feeding-out conveyor.

Belt conveyor ($B_1$) shown in FIG. 36 is constructed such that the pusher ($P_1$) is integrally formed with the belt, an L-shaped reinforcement member ($C_1$) is arranged at the rear surface of said pusher ($P_1$) in its transferring direction and then fixed by screws (121).

Bottom surface of the reinforcement member ($C_1$) is abutted against the belt conveyor ($B_1$) when the packed product is to be pushed so as to prevent the pusher ($P_1$) from being fallen, and the bottom surface is moved away from the belt conveyor ($B_1$) when its transferring direction is changed by a pulley and then the belt conveyor ($B_1$) is positively abutted against the pulley.

Figure 37:
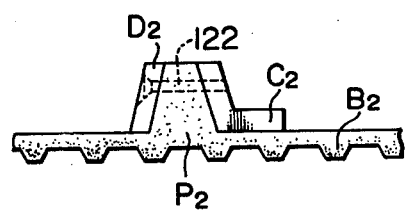
FIG. 37 is a side elevational view of a modification of the present invention.

Belt conveyor ($B_2$) shown in FIG. 37 is constructed such that a slide plate ($D_2$) of duracon or teflon is arranged in front of the pusher ($P_2$) in its transferring direction and a substantial L-shaped reinforcement member ($C_2$) is arranged at a rear surface of said pusher ($P_2$), then fixed by screw (122).

With the above-mentioned arrangement, since the slide plate ($D_2$) is arranged, the packed product is pushed against one side of the belt conveyor ($B_2$) to set its positioning to get a smooth operation.

Figure 38:
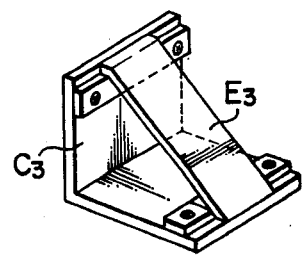
FIGS. 38 to 41 are a perspective view for showing a reinforcement member.

FIG. 38 illustrates a modification of the reinforcement member, wherein at first a thin plate is bent to an L-shape to form a reinforcement member ($C_3$) and a reinforcement plate ($E_3$) is arranged at a rear surface of said reinforcement member ($C_3$).

Figure 39:
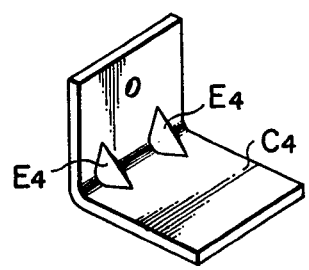

In FIG. 39, a thin plate is bent to an L-shape, said bent part is provided with the inclined projections ($E_4$) and ($E_4$) so as to form the reinforcement member ($C_4$).

The reinforcement members ($C_3$) and ($C_4$) shown in FIGS. 38 and 39 may be formed to show a thinner wall than that of ($C_1$) and ($C_2$) and show the same strength as that of them as well as a relative light weight.

Figure 40:
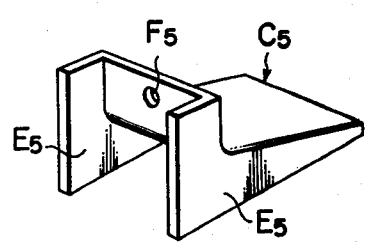

In FIG. 40, the side plates ($E_5$) and ($E_5$) are integrally formed with an L-shaped plate to form a reinforcement member ($C_5$) and at the same time a locking hole ($F_5$) is formed to be engaged with the rear surface of the pusher (not shown).

Figure 41:
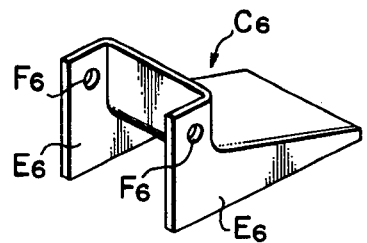
Figure 42:
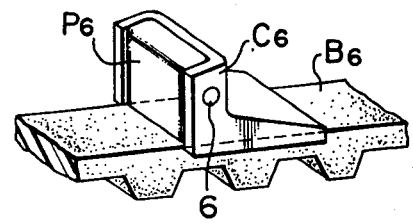
FIGS. 42 to 44 are a perspective view for showing another modification of the present invention.

In FIGS. 41 and 42, the reinforcement member ($C_6$) is constructed such that the side plates ($E_6$) and ($E_6$) are integrally formed to each other and the locking holes ($F_6$) and ($F_6$) are formed in the side plates ($E_6$) and ($E_6$). Said reinforcement member ($C_6$) is locked to the side surface of the pusher ($P_6$) by screws (6) and (6).

Said reinforcement members ($C_6$) and ($C_6$) are constructed such that the side plates ($E_5$) and ($E_6$) are integrally formed, resulting in that a quite high strength can be obtained.

Figure 43:
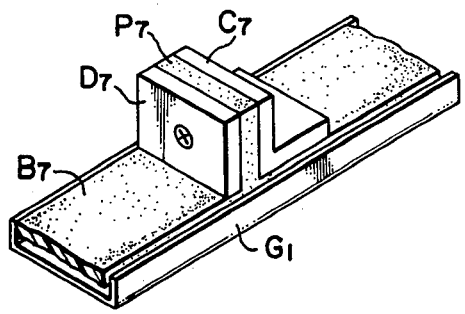

In FIG. 43, the belt conveyor ($B_7$) is constructed such that the slide plate ($D_7$) and the reinforcement member ($C_7$) are arranged in the integrally formed pusher ($P_7$) and a guide plate ($G_1$) is arranged below said belt conveyor ($B_7$). The guide plate ($G_1$) prevents a deflection of the belt conveyor ($B_7$) and guides the belt conveyor ($B_7$) correctly by both sides of the guide plate ($G_1$).

Figure 44:
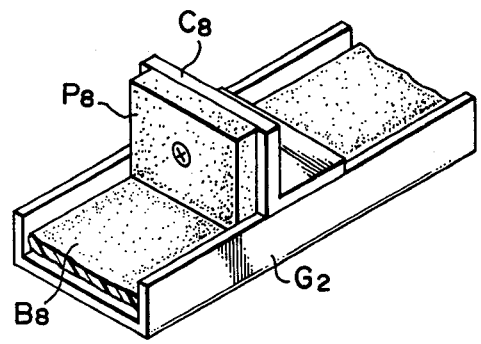
Figure 45:
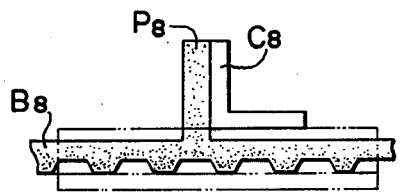
FIG. 45 is a side elevational view of FIG. 44.

In FIGS. 44 and 45, a reinforcement member ($C_8$) having a wider width than that of the pusher ($P_8$) is arranged at the pusher ($P_8$) integrally formed with the belt conveyor ($B_8$) and a guide plate ($G_2$) is arranged at the lower surface of said belt conveyor ($B_8$). The lower surface of the pusher ($P_8$) shows a slight clearance against the belt conveyor ($B_8$) and both lower surfaces of the pusher ($P_8$) are supported by the side frames. That is, a more rate of the stress applied to the pusher ($P_8$) is accepted by the guide plate ($G_2$) than belt conveyor ($B_8$) and thus a load of the belt conveyor ($B_8$) can be reduced.

Figure 46:
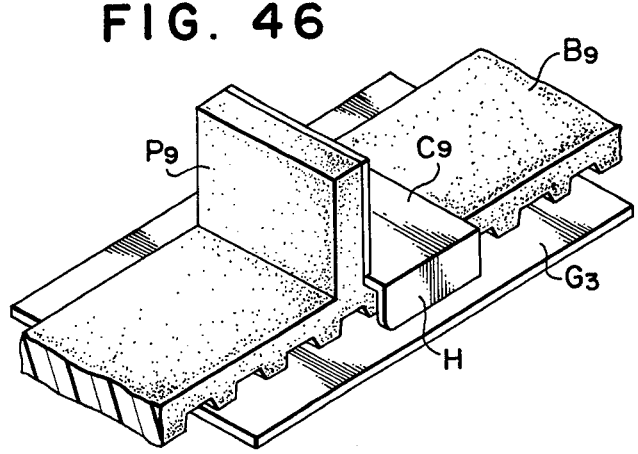
FIG. 46 is a perspective view of another modification of the present invention.

In FIG. 46, the belt conveyor ($B_9$) is integrally formed with the pusher ($P_9$) and said pusher ($P_9$) is provided with a reinforcement member ($C_9$). Said reinforcement member ($C_9$) is provided with a side plate (H) extending downwardly, the plate being abutted against the anti-flexing plate ($G_3$) provided at a lower surface of the belt conveyor ($B_9$). More stress applied to the reinforcement member ($C_9$) is accepted by the anti-flexing plate ($G_3$) and thereby a load of the belt conveyor ($B_9$) may be reduced.

Figure 47:
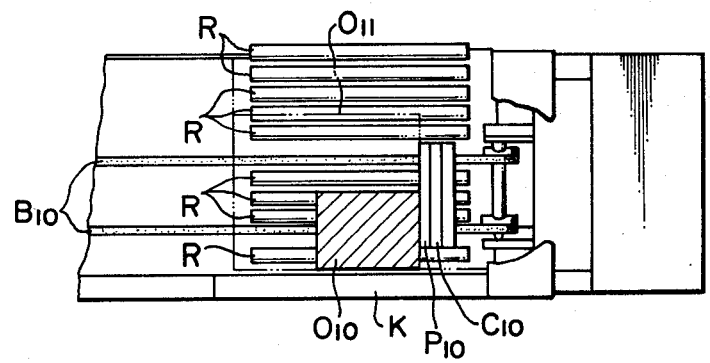
FIG. 47 is a top plan view for showing another modification of the present invention.
Figure 48:
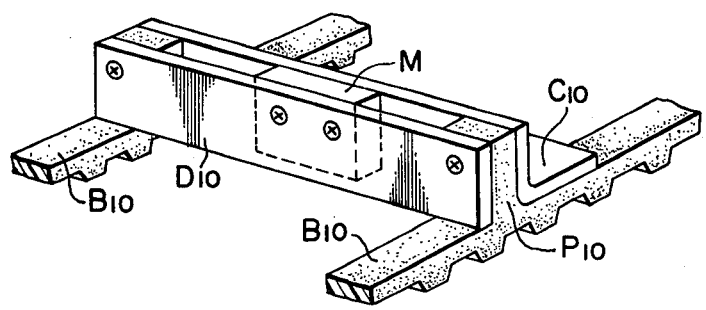
FIG. 48 is a perspective view of FIG. 47.
Figure 52:
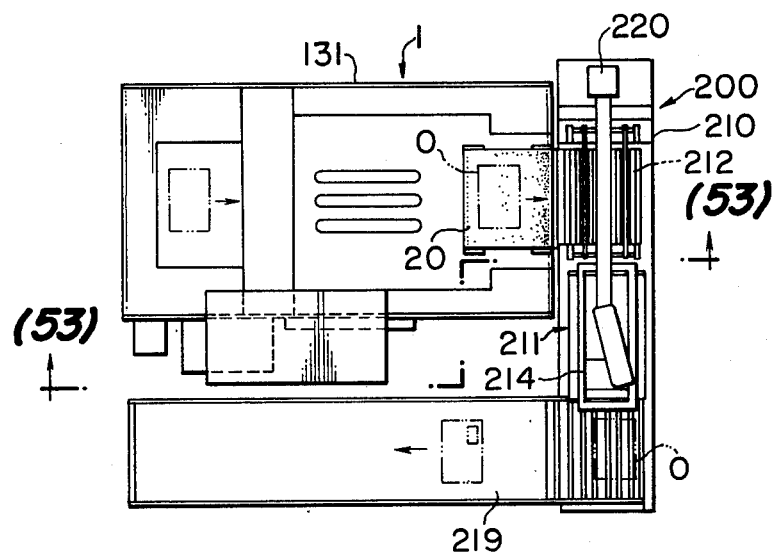
FIG. 52 is a top plan view for showing still further modification of the present invention.
Figure 53:
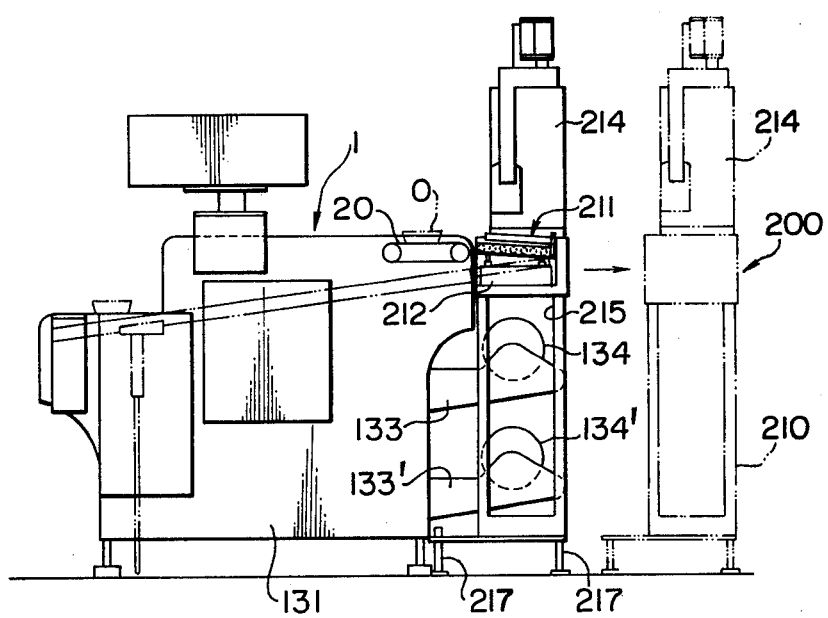
FIG. 53 is a sectional view taken along a line 53—53 of FIG. 52.
Figure 54:
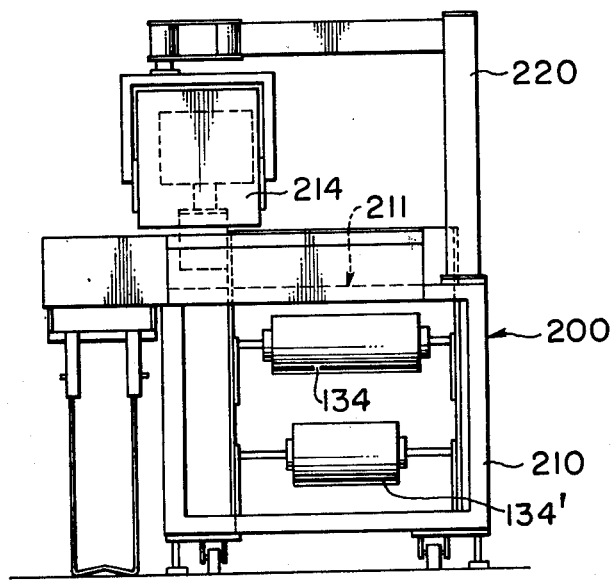
FIG. 54 is a side elevational view of FIG. 52.
Figure 55:
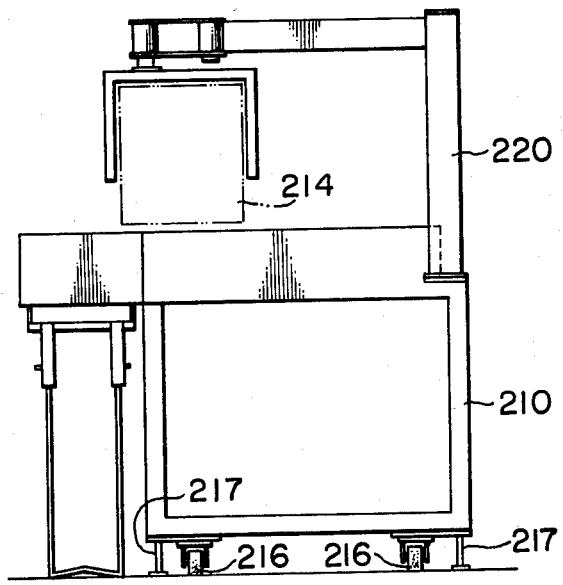
FIG. 55 is a side elevational view for showing only a frame of the device.

In FIGS. 47 and 48, at first the belt conveyors ($B_{10}$) and ($B_{10}$) are arranged in parallel and each of the slide plate ($D_{10}$) and a reinforcement member ($C_{10}$) is arranged over the pushers ($P_{10}$) and ($P_{10}$) provided in each of the belt conveyors ($B_{10}$) and ($B_{10}$). Further, a reinforcement member (M) is arranged between the slide plate ($D_{10}$) and a reinforcement member ($C_{10}$) so as to reinforce them.

Said belt conveyor may provide a stable transferring of even a larger packed product ($O_{11}$) and a light load is applied to the belt conveyor due to the fact that a small and heavy packed product ($O_{10}$) is carried by two belt conveyors ($B_{10}$) and ($B_{10}$) when it is transferred.

FIG. 49 illustrates a modification of the structure shown in FIGS. 47 and 48, wherein the reinforcement member ($O_{11}$) is integrally formed with the upper plate ($H_{11}$), and further formed with the inclined or slant convex parts ($E_{11}$) and ($E_{11}$) similar to that shown in the fourth embodiment so as to keep a strength. The slide plates ($D_{11}$) and ($D_{11}$) are arranged at each of the pushers ($P_{11}$) and ($P_{11}$).

FIG. 50 illustrates the case in which the reinforcement member ($C_{12}$) and the slide plate ($D_{12}$) are arranged in a slant direction with the pushers ($P_{12}$) and ($P_{12}$) of the belt conveyors ($B_{12}$) and ($B_{12}$) and with this arrangement, the packed product ($O_{12}$) is abutted against the position setting plate (N) arranged in parallel with the belt conveyors ($B_{12}$) and ($B_{12}$) and both a correct positioning and a transferring of the packed product may be assured.

In the preferred embodiment shown in FIGS. 47 to 50, the belt conveyors are arranged two by two, and three or more belt conveyors may be provided.

Above-mentioned preferred embodiments are constructed such that all the belt conveyors are integrally formed with the pushers and their separate arrangements may also be provided, their one example being shown in FIG. 51. In the figure, ($B_{13}$) indicates a belt conveyor, the belt conveyor ($B_{13}$) is held by ]-shaped fixing member (E₁₃) and the pusher (P₁₃) and fixed thereby, the reinforcement member (C₁₃) is arranged at the rear surface of said pusher (P₁₃) and a slide plate (D₁₃) is arranged at a front surface of said pusher.

FIGS. 52 to 55 illustrate a preferred embodiment for accomplishing a still further object of the present invention which relates to a frame structure for the device.

In the figures, (1) indicates the above-mentioned automatic packing machine, (20) is a transferring passage, (200) is a scaling and labeling device which is cooperatively connected to the rear end of the machine frame (131) of the packing machine (1).

Support arms (133),(133),(133') and (133') are projected rearwardly in a horizontal direction at a rear end of the machine frame (131) of the above-mentioned packing machine (1), packaging sheet rolls (134) and (134) are laterally supported between each of the arms (133), (133) and (133'), (133') and the packaging sheet to be used for packing product is fed in sequence from said roll (134) or (134').

In the scaling and labeling machine (200), a scaling unit (212) and a labeling unit (214) are mounted on the main body of the frame (210).

The main body of the frame (210) is formed as a rectangular frame with a four-side circumference composed of upper and lower planes and right and left side planes to which some angle members and pipe members etc. are assembled, then its depth side is made open and its right and left side planes are spaced apart between the two angle members to form a side opening part (215).

The depth side, i.e. a side width of the main body of the frame (210) is made to be a minimum width required for forming a transferring passage for the packed product (O) on the upper surface of the main body of the frame (210).

To the bottom part of the main body of the frame (210) are fixed casters (216), (216) . . . to cause the main body of the frame (210) to be movable, the locking members (217) and (217) are arranged in such a way as they may be extended or retracted, and the main body of the frame (210) may be stopped and fixed at a desired position.

On the upper surface of said main body of the frame (210) is longitudinally formed a feeding-out means (211).

In the figure, (219) indicates a discharging passage which is cooperatively connected to the discharging passage (211), and (220) indicates a support column for supporting the labeling unit (214).

Thus, since the packaging sheet rolls (134) and (134') of the packing machine (1) are inserted and positioned in the main body of the frame (210) of said labeling unit (200), the operater inserts the hand at the opening of the rear surface of the main body of the frame (210) and if required inserts the other hand at the side opening (215) to perform the replacing of the rolls (134) and (134').

FIGS. 56 to 62 illustrate a preferred embodiment for performing a still further object of the present invention which relates to an improvement of the support structure for the labeling unit.

In the figures, the labeling unit (214) is basically of the above-mentioned unit shown in FIGS. 52 to 55, wherein the support column (220) is raised on the above-mentioned main body of the frame (210). At first, in FIGS. 56 to 58, a fixed arm (221) is projected horizontally from the upper end of the support column (220) and a rotating shaft (222) is arranged. One end of each of the plate members (223) and (223) is rotatably arranged above and below the rotating shaft (222), respectively, and said plate members (223) and (223) are projected horizontally and in parallel to each other and a vertical inserted rotating shaft (224) is arranged therein. Below the rotating shaft (224) is hung a gate-shaped frame (225) as a fixing plate and a labeling unit (214) is arranged in said frame.

Below said frame (225) are arranged holes (226) vertically and properly spaced apart relation, a bolt is inserted into any one of said holes (226) to fasten the labeling unit (214). Height of the labeling unit (214) can be adjusted by varying a position of the hole (226).

Figure 56:
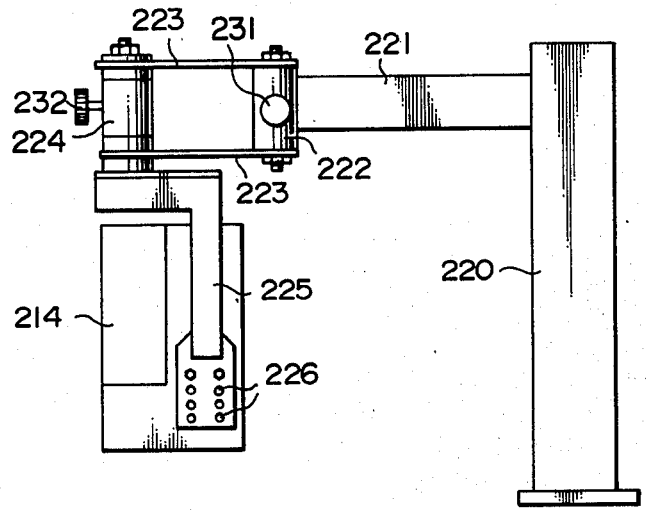
FIG. 56 is a front elevational view for showing a support structure for the labeling unit.
Figure 57:
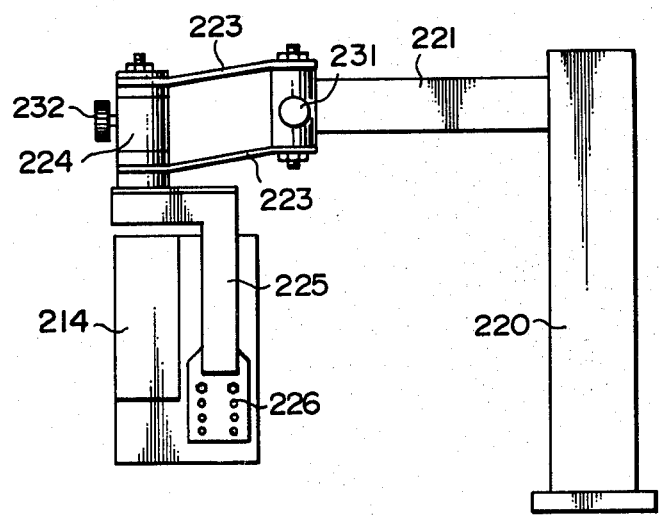
FIG. 57 is a front elevational view for illustrating the operation of the labeling unit.
Figure 58:
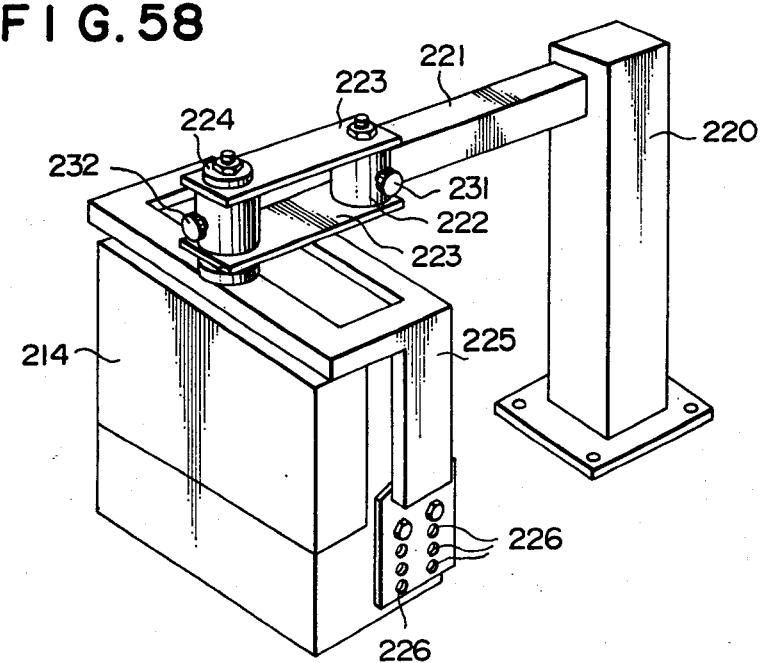
FIG. 58 is a perspective view of FIG. 57.

The above-mentioned supporting method is performed at first as illustrated in FIG. 56, and as the time passes, the method is varied as illustrated in FIG. 57. That is, the plate members (223) and (223) and the rotating shafts (224) and (222) are varied to show a parallelogram, so that the labeling unit (214) is always kept vertical.

Figure 59:
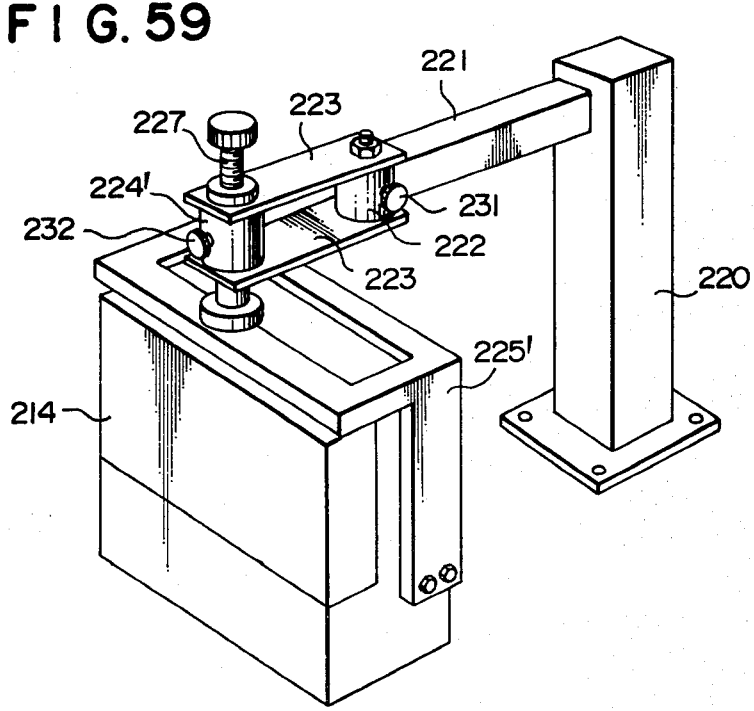
FIG. 59 is a perspective view for showing a modification of the support structure.

FIG. 59 illustrates a modification of the present invention, wherein a vertical adjusting screw (227) passes through the rotating shaft (224'), a frame (225') is hung at the lower part of said screw (227) and then a labeling unit (214) is fixed in said frame (225').

That is, a height of the labeling unit (214) can be varied by rotating the vertical adjusting screw (227).

Figure 60:
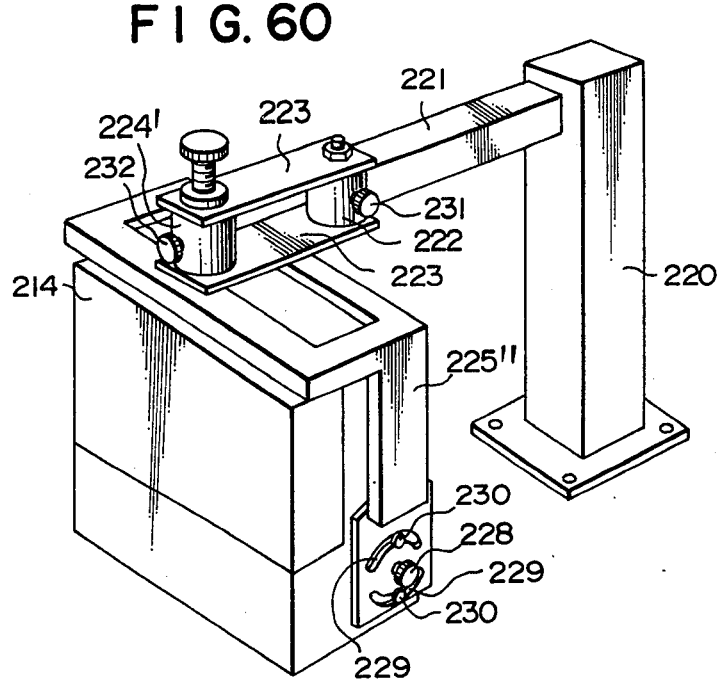
FIG. 60 is a perspective view for showing a still further modification of the support structure.

FIG. 60 illustrates another modification of the present invention, wherein there is arranged a mechanism for adjusting an inclination of the labeling unit (214) in the modification shown in FIG. 59 and the labeling unit (214) is inclined around the shaft (228). The frame (225'') is provided with an arcular groove (229), a bolt (230) passes through said groove (229) and fastened to the labeling unit (214), thereby the frame can be inclined at any angle. Therefore, a positive labeling operation can be performed even at an inclined surface of the product.

The knobs (231) and (232) are used to fix the rotating shafts (224') and (222), a position and direction of the labeling machine (A) are set by loosening said knobs (231) and (232) and then fixed by fastening said knobs (231) and (232).

In the above-mentioned preferred embodiments, any one of the fixing plates has been formed of a gate-shaped one and the fixing plate may be of a simple planer plate and a part of the main body of the frame of the labeling unit may be utilized as a fixing plate.

Figure 61:
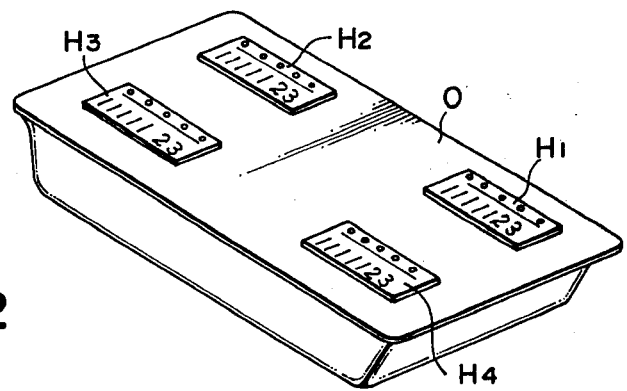
FIGS. 61 and 62 are a perspective view for showing one example of the packed products to which a label is adhered.
Figure 62:
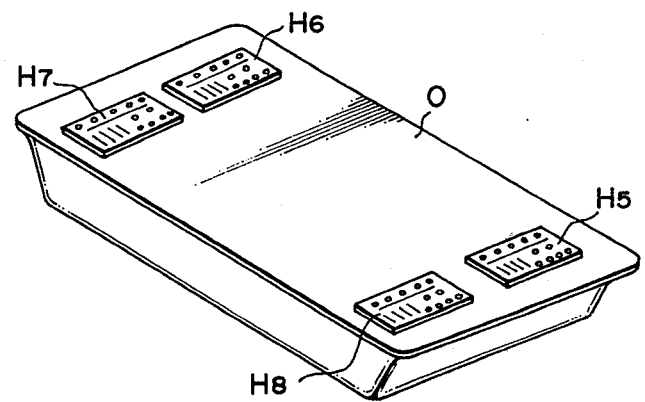
Figure 63:
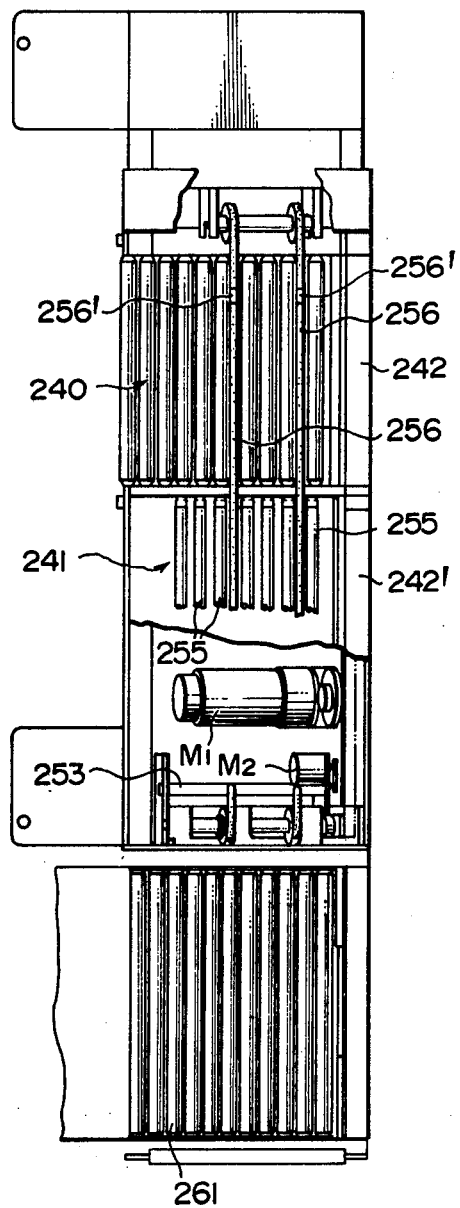
FIG. 63 is a top plan view in partly broken away for showing still further embodiment of the present invention.

Thus, the above-mentioned labeling unit (214) can be set to adjust its orientation and position, as illustrated in FIGS. 61 and 62, to adhere the labels (H₁) to (H₈) to the packed products (O) at their any position and orientation.

Since the labeling unit may not show any inclination thereof caused by a secular change, an accuracy of labeling operation can be kept for a long period of time and a poor adhering having less close contact such as found in one lifted side of the label.

FIGS. 64 to 70 illustrate a preferred embodiment for accomplishing a still further object of the present invention which relates to an improvement of means for moving the packed products on the transferring passage.

Figure 64:
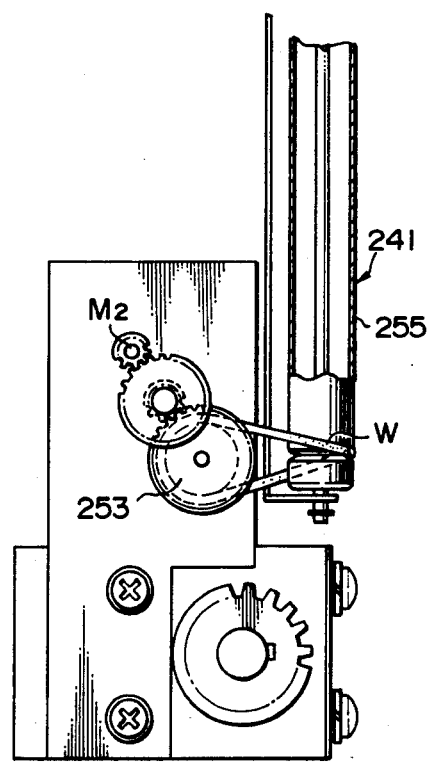
FIG. 64 is a front elevational view of FIG. 63.

In FIG. 64, (240) indicates a roller conveyor mounted on the scaling unit (not shown), (241) indicates a feeding-out conveyor arranged adjacent to said conveyor (240), and then (242) and (242') are a guide plate, respectively.

The feeding-out conveyor (241) is constructed such that a plurality of rollers (255) and (255) are arranged side by side to rotate freely, a driving roller (253) is arranged in such a way as its axis is crossed at a right angle thereto, and the driving roller (253) and each of the rollers (255) are connected by a wire (W), respectively. The driving roller (255) is connected to the motor ($M_2$) and the products on the feeding-out conveyor (241) are abutted against a guide plate (242') under a driving of said motor ($M_2$). Over the feeding-out conveyor (241) is arranged a labeling unit (not shown) and as described above, the label is adhered to the packed products being transferred.

Over said roller conveyor (240) and the feeding-out conveyor (241) are arranged in tension the belt conveyors (256) and (256), the motor ($M_1$) is cooperatively arranged to said conveyors (256) and (256), and the pushers (256') and (256') for transferring the products are formed on the surface of said belt conveyors (256) and (256) and the products are transferred from the roller conveyor (240) to the terminal end of the feeding-out conveyor (241).

At the terminal end of said feeding-out conveyor (241) is arranged the discharging conveyor (261) so as to transfer the products already scaled and labeled.

Figure 65:
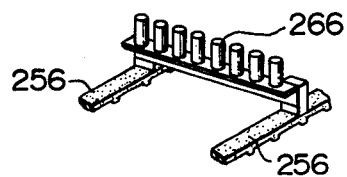
FIGS. 65 and 66 are a perspective view for showing a modification of a pusher.
Figure 66:
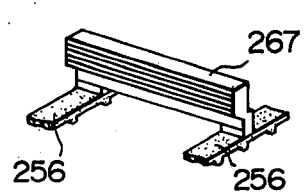

FIGS. 65 and 66 illustrate a modification of said pushers (256') and (256'), and the pusher (266) shown in FIG. 65 is arranged to place a plate over the belt conveyors (256) and (256) and a plurality of rollers are arranged side by side over said plate in such a way as they may be freely rotated. The pusher (267) shown in FIG. 66 is constructed such that plates are raised on the belt conveyors (256) and (256) and teflon is coated on their surfaces to which the products are abutted. Said pushers (266) and (267) reduce the friction between the pushers and the products abutting thereto and facilitate the abutting of the products against the guide plates (242) and (242'), such pushers as above may be used.

The products of which scaling is completed on the roller conveyor (240) are transferred onto the feeding-out conveyor (241) by the pushers (256) and (256') of the belt conveyors (256) and (256), said products are moved toward the guide plate (242') under a rotation of the rollers (255), (255) . . . while they are moved on the feeding-out conveyor (241), a position of one side edge of the packed product is positively defined in reference to the guide plate (242') while it is being abutted against said plate (242') and then the product is moved to the labeling unit.

In the above-mentioned preferred embodiment, the rollers (255) and (255) . . . may be rotated continuously or only when the products are placed thereon.

It is optional that the feeding-in conveyor (240) and the transferring conveyor (241) may be inclined or kept horizontal.

Figure 67:
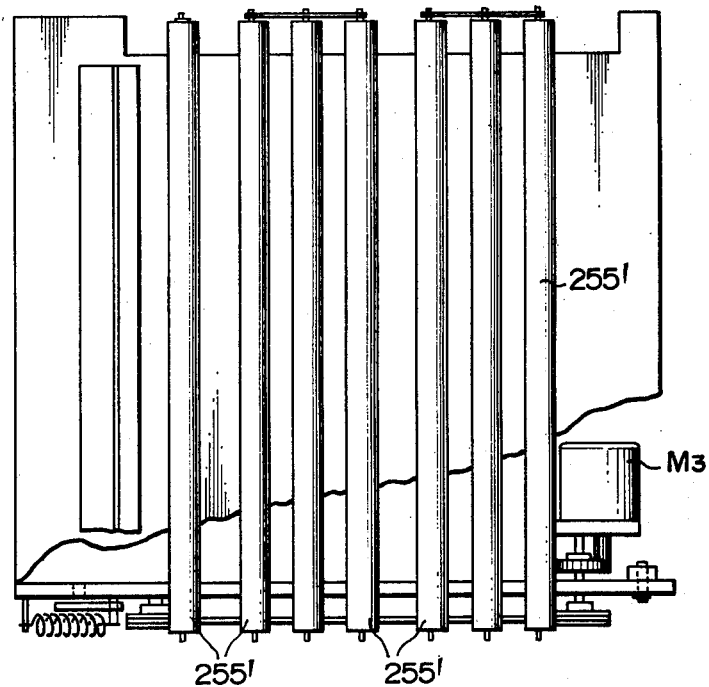
FIG. 67 is a top plan view in partly broken away for showing a modification of the driving mechanism for rollers.
Figure 68:
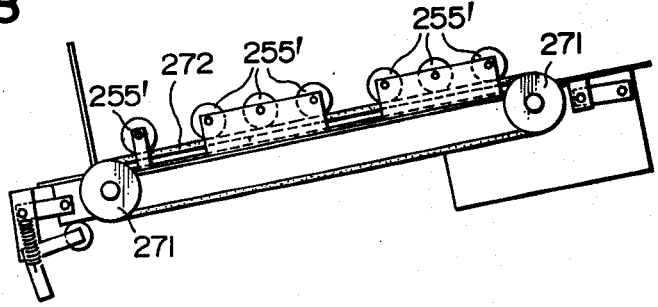
FIG. 68 is a front elevational view of FIG. 67.

FIGS. 67 and 68 illustrate a modification of the roller driving mechanism for the feeding-out conveyor, wherein (255'), (255') . . . indicate the rollers which are arranged in parallel, pulleys (271) and (271) are arranged at one side of said rollers (255'), (255'), and a belt (272) is arranged over said pulleys (271), (271) so as to cause the rollers (255'), (255') to be abutted against the belt (272).

Motor ($M_3$) is cooperatively connected to said pulley (271), said pulley (271) is rotated to drive the rollers (255') and (255'). The contact length is short enough to carry a relative light weight product.

Figure 69:
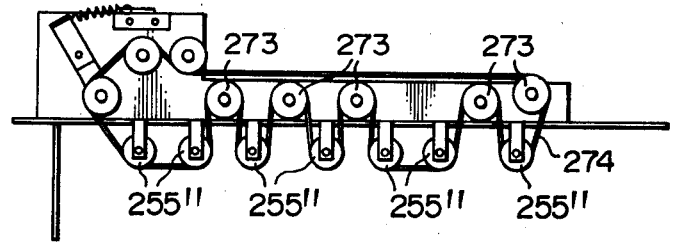
FIG. 69 is a front elevational view for showing a substantial part of a modification of the driving mechanism.
Figure 70:
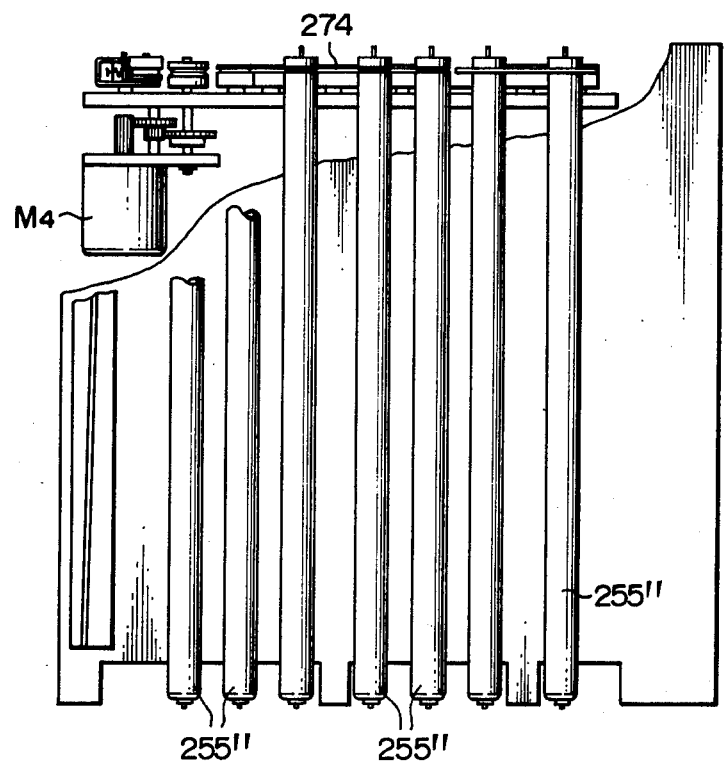
FIG. 70 is a top plan view in partly broken away of FIG. 69.
Figure 71:
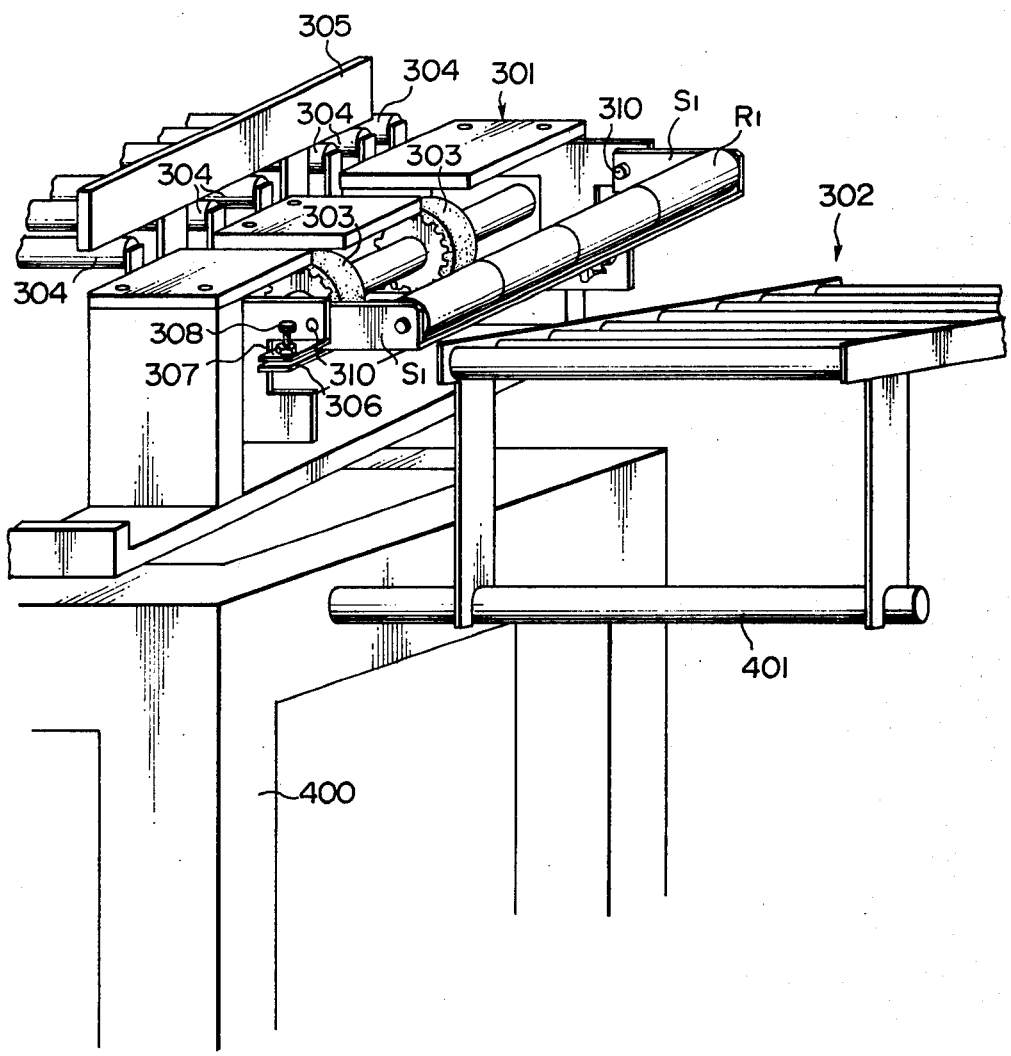
FIG. 71 is a perspective view for showing still further preferred embodiments of the present invention.
Figure 72:
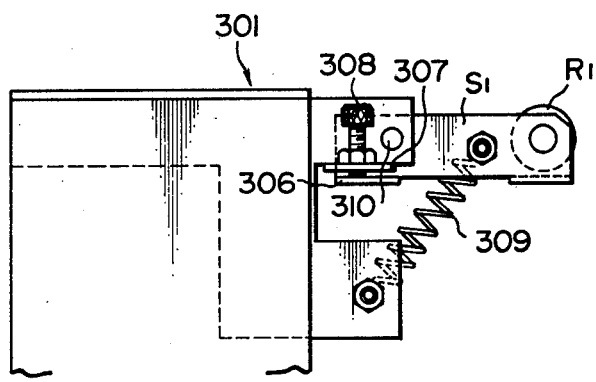
FIG. 72 is an enlarged side elevational view for showing a substantial part of the present invention.
Figure 73:
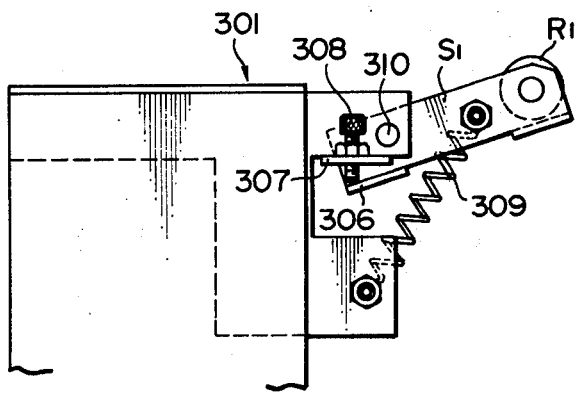
FIGS. 73 and 74 are a side elevational view for illustrating an operation of the present invention.
Figure 74:
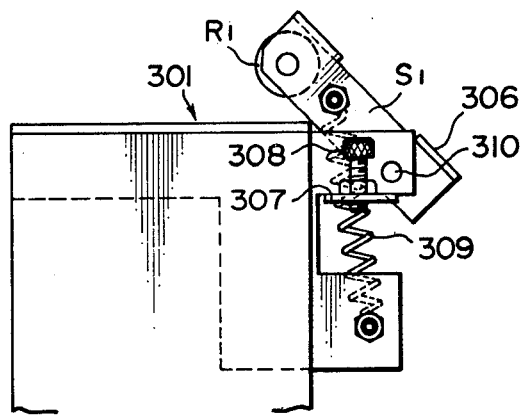

FIGS. 69 and 70 illustrate another modification, wherein a plurality of rollers (255") and (255") are arranged in parallel, and pulleys (273) and (273) . . . are alternatively arranged with said rollers (255") and (255"), then the belts (274) is arranged in an alternative relation with the rollers.

Motor ($M_4$) is cooperatively connected to said belt (274) to rotate each of the rollers (255") and (255"). With this arrangement, a contact length between each of the rollers (255") and (255") and the belt (274) may show a long length, the driving force may sufficiently be transferred to the roller (255") and a heavy weight packed product can be processed.

FIGS. 71 to 81 illustrate a preferred embodiment for accomplishing a still further object of the present invention which relates to an improvement of means for delivering the packed products to the discharging conveyor from the feeding-out passage having a feeding-out conveyor with pushers in a structure, wherein a discharging conveyor is arranged to abut at a right angle to a terminal end of the feeding-out passage for the packed product as illustrated in FIGS. 1 and 2 or FIGS. 10 and 11 to change the transferring direction of the packed products at a right angle to said position.

At first, in FIGS. 70 to 73, (301) indicates a feeding-out passage and (302) indicates a discharging conveyor.

The feeding-out passage (301) is composed of a roller conveyor constituted by rollers (304), (304) . . . in the same manner as described in the previous preferred embodiment, and the feeding-out conveyors (303) and (303) composed of belt conveyor are arranged between the rollers (304) and (304), and pushers (305) are projected in said conveyors (303) and (303), thereby the packed products are transferred to the discharging conveyor (302) by the pushers (305). The discharging conveyor (302) transfers the packed products fed out of the feeding-out passage (301) in a direction at a right angle thereto, wherein a free rotated roller conveyor is arranged to show an inclined condition.

Between the above-mentioned feeding-out passage (301) and the discharging conveyor (302) is arranged a delivery roller ($R_1$). The delivery roller ($R_1$) is constructed such that the support arms ($S_1$) and ($S_1$) are arranged at the frame part constituting the feeding-out passage (301) through the pivot shafts (310) and (310) and the delivery roller ($R_1$) is rotatably pivoted with a clearance corresponding to a height of the pusher (305) at the extremity ends of said arms ($S_1$) and ($S_1$). Fixing plates (307) and (307) are arranged at the feeding-out passage (301), and the engaging plates (306) and (306) are arranged to face oppositely against the support arms ($S_1$) and ($S_1$), and the adjusting bolts (308) and (308) are arranged in the fixing plates (307) and (307) with their lock nuts. The support arms ($S_1$) and ($S_1$) are provided with a positioning spring (309) for use in tensioning the arms downwardly.

Said adjusting screw (308) is used for adjusting a height of the delivery roller ($R_1$) with a feeding-in or feeding-out of the adjusting screw (308) when the discharging conveyor (302) is varied and its height is changed, thereby the packed products may smoothly be delivered. The delivery rolller ($R_1$) may be folded toward the feeding-out passage (301) under an action of spring (309) when it is rotated upwardly around the pivot shaft (310).

Since the packed products are fed out to the terminal end of the feeding-out passage (301) and the delivery roller ($R_1$) is positioned at the extremity end of the reverse rotated pusher (305), the packed products are transferred to the discharging conveyor (302) without being held by the pushers (305). The delivery roller (R₁) delivered the packed products is rotated by its inertia force and a transferring speed of the next packed product is not decreased, so that a holding of the packed product may be kept minimum.

Figure 75:
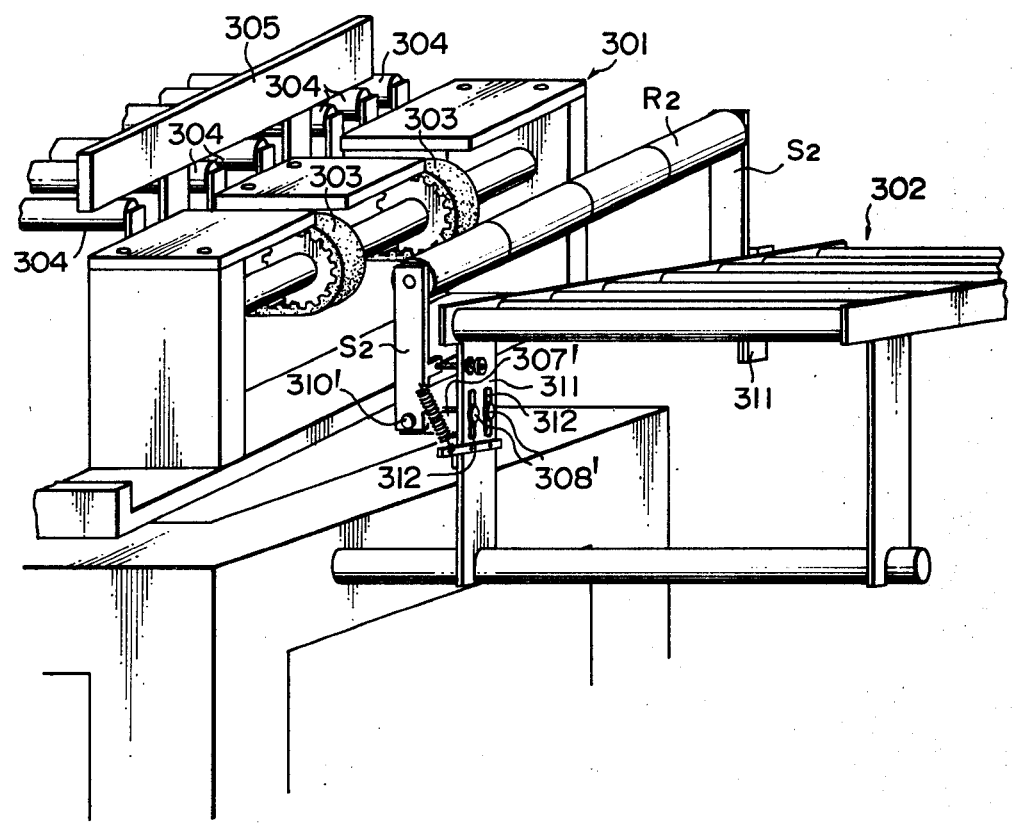
FIG. 75 is a perspective view for showing a modification of the present invention.
Figure 76:
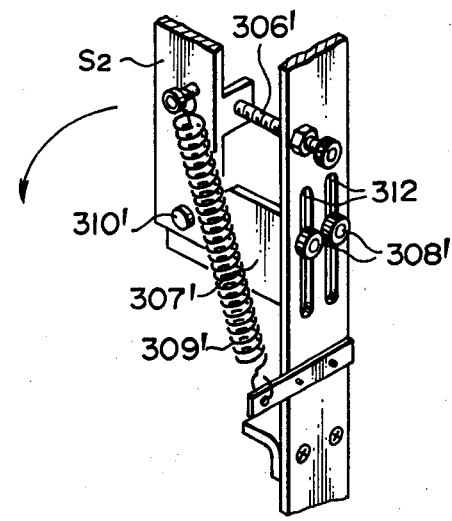
FIG. 76 is an enlarged perspective view for showing a substantial part of the present invention.
Figure 77:
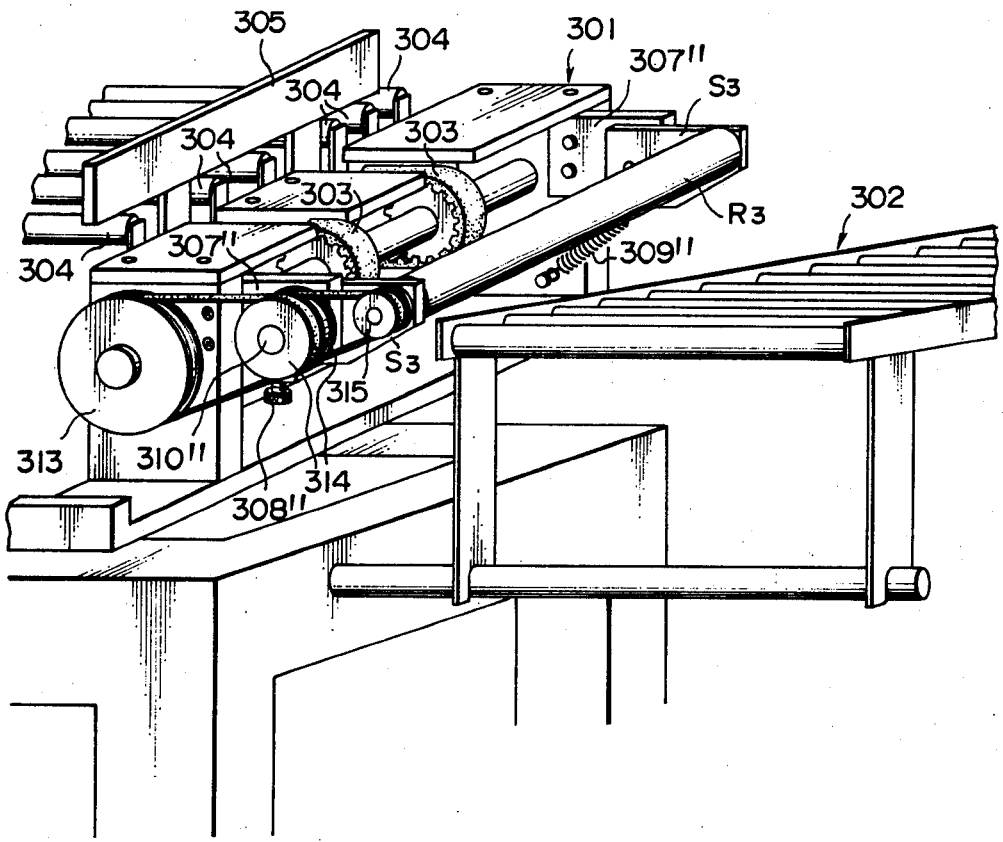
FIG. 77 is a perspective view for showing still further modification of the present invention.

FIGS. 75 and 76 illustrate a modification of the present invention, wherein a delivery roller (R₁) is arranged at the discharging conveyor (302), and side plates (311) and (311) are arranged at the discharging conveyor (302), longitudinal holes (312) and (312) are made in each of said side plates (311) and (311), the fixing plates (307') and (307') are threadably engaged with the screws (308') and (308') in such a way as they may be vertically slid and fixed, and at the same time the support arms (S₂) and (S₂) are rotatably pivoted around the pivot shafts (310') and (310') at the extremity ends of the fixing plates (307) and (307). The support arms (S₂) and (S₂) are supported to be raised by the spring (309') and the stopper (306') and the delivery roller (R₂) is rotatably arranged at the extremity end thereof.

In the above-mentioned preferred embodiment, a height of the delivery roller (R₂) is adjusted by the fixing plates (307') and (307'), and both the fixing position of the discharging conveyor (302) and the releasing of the pusher (305) under a feeding-in or feeding-out of the stopper (306') can be adjusted. Further, the support arms (S₂) and (S₂) can be rotated downwardly and bent down.

FIGS. 77 to 80 illustrate another modification of the present invention, wherein the delivery roller (R₃) is driven to forcedly feed out the packed products.

Figure 78:
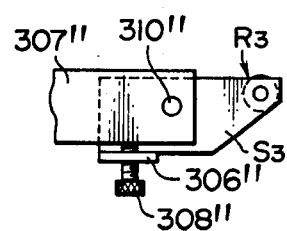
FIGS. 78 and 79 are an illustrative view for showing a height adjustment of the modification of the present invention.

Fixing plates (307") and (307") are projected at the feeding-out part of the feeding-out passage (301), and the support arms (S₃) and (S₃) rotatable around the pivot shafts (310") and (310") are arranged at said fixing plates (307") and (307") and a delivery roller (R₃) is rotatably arranged at the extremity ends of said support arms (S₃) and (S₃). The support arms (S₃) and (S₃) are integrally formed with an adjusting plate (306"), an adjusting screw (308") is arranged to enable an adjustment of height of the delivery roller (R₃) (FIGS. 78 and 79).

Pulley (313) is concentrically arranged to the support shaft of the feeding-out conveyor (303) and intermediate pulleys (314) and (314) are integrally arranged with the pivot shaft (310") and pivoted to be rotated. Integrally rotated pulley (315) is arranged at the delivery roller (R₃), the pulley (315) is constructed to show a smaller diameter than that of the pulley (313), and then the pulleys (313), (314), (314) and (315) are cooperatively arranged.

Thus, in the above-mentioned preferred embodiment, no holding of the packed products is found due to the fact that the delivery roller (R₃) transfers the packed products at such a transferring speed as faster than the feeding-out conveyor (302).

Figure 79:
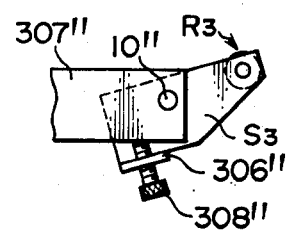
Figure 80:
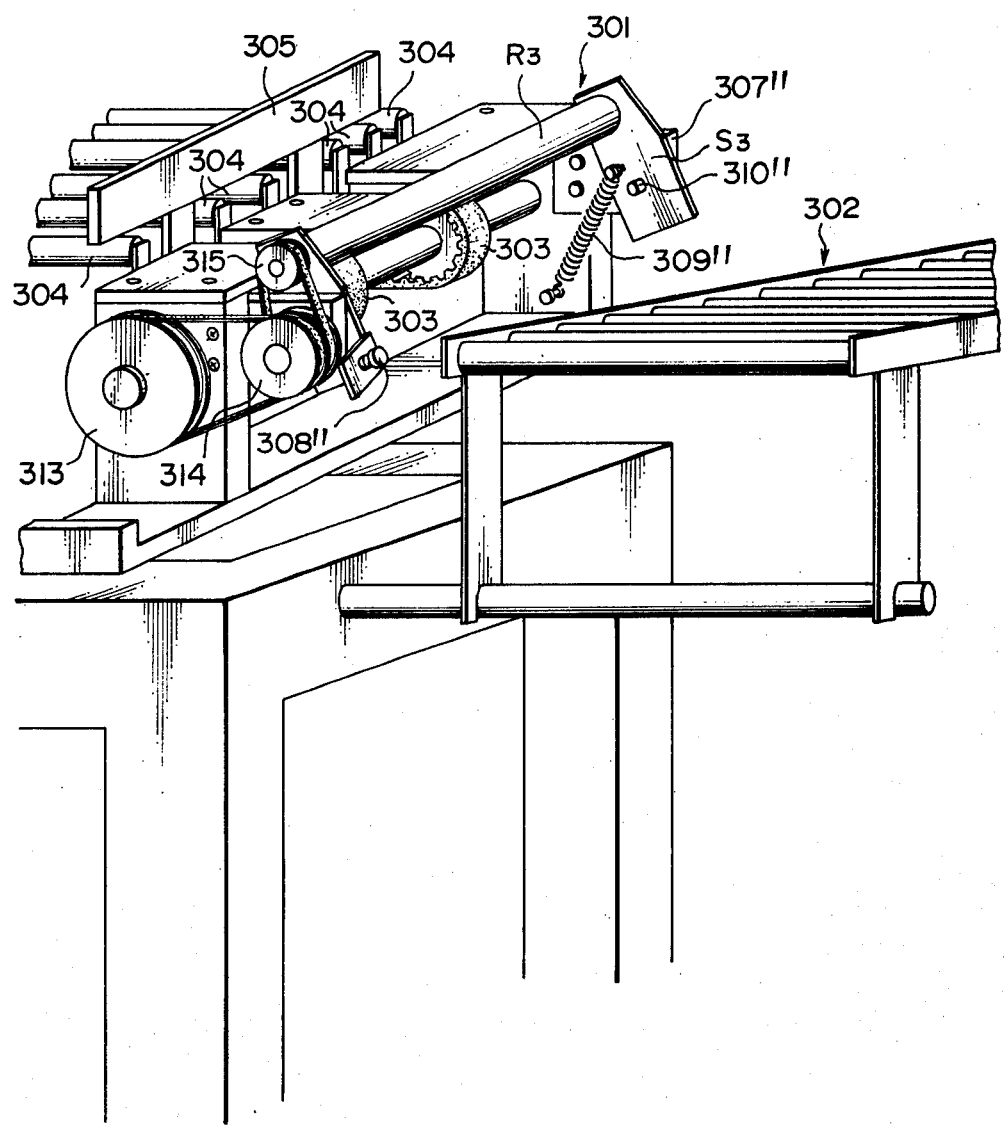
FIG. 80 is an illustrative view for showing an operation of the modification shown in FIG. 77.
Figure 81:
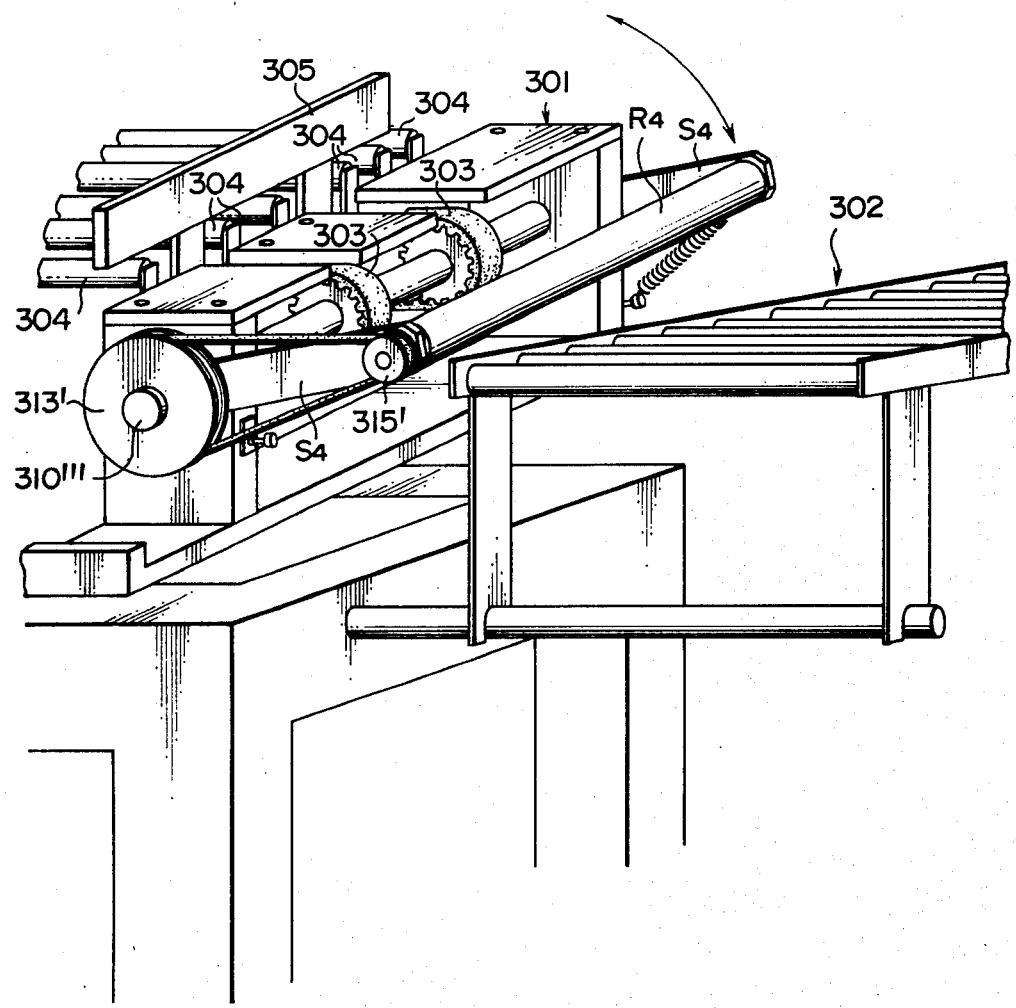
FIG. 81 is a perspective view for showing still further modification of the present invention.

FIG. 81 illustrates another modification in which the preferred embodiment shown in FIGS. 79 to 80 is simplified more, wherein the support arms (S₄) and (S₄) are arranged around the support shaft (310''') of the feeding-out conveyor (303), the delivery roller (R₄) is arranged at the extremity ends of said arms (S₄) and (S₄) and at the same time a pulley (313') is connected to the support shaft (310''') and a pulley (315') is connected to the delivery roller (R₄), respectively, and they are cooperatively provided.

Said delivery roller (R₄) is rotated faster than the feeding-out conveyor (303) similar to that shown in FIGS. 79 and 80, wherein no holding of the packed products is found and the delivery roller may be rotated around the support shaft (310''') and folded down.

In the preferred embodiment shown in FIGS. 79 to 80 and FIG. 81, a faster transferring speed can be applied to the packed products when they are delivered and a quite smooth delivery of the packed products may be performed.

What is claimed is:

1. Scaling and labeling apparatus in which a scaling unit and a labeling unit are arranged in a moving passage for the packed product which is continuous to a terminal end of the transferring passage, the packed product is scaled by said scaling unit and a label relating to said product is adhered to the packed product by a labeling unit characterized in that the scaling unit is operated to accept the packed product on said transferring passage and scales said packed product while it is temporarily stopped, has a feeding-out passage for moving the packed product on the scaling unit in such a direction as crossing at a right angle to a direction of said transferring passage and a feeding-out means.

2. Scaling and labeling apparatus as set forth in claim 1) in which a scaling pan of said scaling unit is of an inclined surface with its front end directed downwardly, a stopper is projected at the lower end of said inclined surface to stop the packed product temporarily on the scaling pan, and the feeding-out passage is also constructed of an inclined surface structure which is continuous to said scaling pan.

3. Scaling the labeling apparatus as set forth in claim 1) in which a scaling pan of said scaling unit and a transferring passage are arranged horizontally and a moving means for moving and stopping the packed product on the terminal end of the transferring passage to a specified position on the scaling pan is arranged near said scaling pan.

4. Scaling and labeling apparatus as set forth in claims 1), 2) or claim 3) in which said scaling and labeling apparatus is removably assembled to a packing machine.

5. Scaling and labeling apparatus as set forth in claims 1), 2) or claim 3) in which said scaling and labeling apparatus is integrally assembled to a packing machine.

6. Scaling and labeling apparatus as set forth in claim 5) in which a scaling pan of said scaling unit is composed of a roller conveyor having a plurality of rollers arranged side by side and the feeding-out means is of a conveyor with pushers moved between the rollers of said conveyor.

7. Scaling and labeling apparatus as set forth in claim 6) in which said conveyor with pushers is of a belt conveyor.

8. Scaling and labeling apparatus as set forth in claim 1) characterized in that there is provided a sensor for sensing that a packed product is irregularly fed onto the scaling unit, and there is provided a discharging means operated by said sensor so as to discharge the packed product from on the scaling unit.

9. Scaling and labeling apparatus as set forth in claim 8) in which said sensor senses that a plurality of packed products are fed onto the scaling unit.

10. Scaling and labeling apparatus as set forth in claim 8) in which a timer for counting a duration time in which a packed product is carried on a scaling unit and a scaling stable signal or a scaling completion signal is produced is applied as a sensor, and there is provided a discharging means for discharging the packed product when a standard scaling time is preset in said sensor and operated when the count in the sensor exceeds said standard scaling time.

11. Scaling and labeling apparatus as set forth in claim 8) in which there is provided a sensor for sensing that a packed product is carried on a scaling unit and a feeding-in of the next packed product is sensed before a scaling stable signal or a scaling completion signal is produced, and there is provided a discharging means for discharging the packed product which is operated by said sensor.

12. Scaling and labeling apparatus as set forth in claim 8) in which there is provided a sensor for sensing that the packed product is fed in to project from the scaling pan of the scaling unit and there is provided a discharging means for discharging the packed product which is operated by said sensor.

13. Scaling and labeling apparatus as set forth in claim 6) in which each of the rollers of the roller conveyor is arranged to rotate freely, there is provided a mechanism for braking a rotation of the roller and there is also provided a mechanism for adjusting a braking force of said braking mechanism.

14. Scaling and labeling apparatus as set forth in claim 13) in which the mechanism for braking a rotation of said roller is a mechanism for braking each of the rollers.

15. Scaling and labeling apparatus as set forth in claim 13) in which said braking mechanism is a mechanism for braking a plurality of rollers.

16. Sealing and labeling apparatus as set forth in claim 1) in which to the feeding-out means and the labeling unit is connected through a central processing unit (CPU) a discriminating part for sensing that the product does not require a scaling (rated product) and both the feeding-out operation of said feeding-out means and the label issuing operation of the labeling unit are energized in response to a sensed signal produced from the discriminating part.

17. Scaling the labeling apparatus as set forth in claim 16) in which said feeding-out means is constructed of a belt conveyor with pushers.

18. Scaling and labeling apparatus as set forth in claims 1) to 5) characterized in that a scaling pan of a scaling unit is constructed of a conveyor, a main shaft acting as a source for a rotational driving is removably arranged through a clutch mechanism at a driven part of said conveyor, said clutch mechanism removes said main shaft from the driven part when the scaling operation of the scaling unit is performed.

19. Scaling and labeling apparatus as set forth in claim 18) in which said conveyor is a roller conveyor, a feeding-out means is a belt conveyor with pushers which is rotatably moved between the rollers of the roller conveyor.

20. Scaling and labeling apparatus as set forth in claim 7) in which there is provided a sensor which is operated by the approaching of the pushers of the conveyor and the conveyor is stopped in response to the output signal of said sensor.

21. Scaling and labeling apparatus as set forth in claim 20) in which an intermittent feeding-out operation is repeatedly by applying a starting instruction signal.

22. Scaling and labeling apparatus as set forth in claim 7) in which the belt conveyor is provided with a reinforcement member at the rear surfaces of pushers in their moving direction.

23. Scaling and labeling apparatus as set forth in claim 22) in which said pushers are integrally formed with the belt conveyor.

24. Scaling and labeling apparatus as set forth in claim 22) in which said pushers are separately formed against the belt conveyor.

25. Scaling and labeling apparatus as set forth in claim 22) in which said reinforcement member is of a substantial L-shape, its raised wall is abutted against the pushers and fixed thereto.

26. Scaling and labeling apparatus as set forth in claim 25) wherein side plates projecting below the belt conveyor are formed at a horizontal wall of said reinforcement member, and the lower ends of said side plates are abutted against the anti-flexing plate arranged below said side plates.

27. Scaling and labeling apparatus as set forth in claim 25) wherein said reinforcement member is of a wider width than that of the pusher, below the belt conveyor are arranged guide plates having side edges projected at both sides of said conveyor, and a lower surface of the horizontal wall of said reinforcement member is abutted against the side edges.

28. Scaling and labeling apparatus as set forth in claim 22) wherein there is arranged a plate member processed with a sliding material such a duracon or a teflon coating etc. at a front surface of said pusher in its moving direction.

29. Scaling and labeling apparatus as set forth in claim 4) wherein a main body of a frame is formed of a four-side enclosing member, its depth forms a rectangular open frame, both a scaling unit and a labeling unit are arranged side by side in a width direction of the main body of the frame, and a roll of packaging sheet of said packing machine is inserted into the rectangular frame of the main body of the frame and positioned therein.

30. Scaling and labeling apparatus in which a scaling unit and a labeling unit are arranged at a moving passage for a packed product which is continuous to a terminal end of a transferring passage of a packing machine, the packed product is scaled by said scaling unit and at the same time a label relating to said product is adhered to the packed product by the labeling unit, the improvement in which there are provided a feeding-out passage and a feeding-out means for moving the packed product of which scaling is completed by said scaling unit in a direction perpendicular to said transferring passage direction, and said labeling unit is mounted with being hung over feeding-out passage.

31. Scaling and labeling apparatus as set forth in claim 30) in which said product is scaled while the packed product on the transferring passage is accepted by said scaling unit and temporarily stopped thereon.

32. Scaling and labeling apparatus as set forth in claim 30) or 31) in which a support column is raised on the main body of a frame of the apparatus, a horizontal arm projected on the feeding-out passage is arranged at the upper end of the support column, rotating shafts inserted vertically are arranged at each end of the plates arranged in parallel in a vertical direction, one of said rotating shafts is engaged with an extremity end of said arm and the other rotating shaft is provided with a labeling unit through a fixing frame.

33. Scaling and labeling apparatus as set forth in claim 32) in which said fixing frame is provided with a labeling unit in such a way as its vertical position may be adjusted.

34. Scaling and labeling apparatus as set forth in claim 33) in which said fixing frame is provided with a labeling unit in such a way as it may be swivelled and it may be locked at a inclined position.

35. Scaling and labeling apparatus as set forth in claim 33) in which guide plates for positioning one side edge of the packed product are raised at one side of the feeding-out passage and the feeding-out passage is provided with a mechanism for moving the packed product toward the guide plates.

36. Scaling and labeling apparatus as set forth in claim 35) in which said feeding-out passage is of a roller conveyor composed of a plurality of rollers arranged in parallel in the guide plates, and said moving mechanism is of a driving mechanism for rotating each of the rollers in the roller conveyor.

37. Scaling and labeling apparatus as set forth in claim 36) in which each of the rollers of said roller conveyor is cooperatively connected to a driving machine through one piece of belt.

38. Scaling and labeling apparatus as set forth in claim 36) in which each of the rollers of said roller conveyor is cooperatively connected to the driving mechanism through a plurality of belts.

39. Scaling and labeling apparatus in which a scaling unit and a labeling unit are arranged in a moving passage for the packed product which is continuous to a terminal end of the transferring passage of a packing machine, the packed product is scaled by said scaling unit and a label relating to said product is adhered to the packed product by a labeling unit, the improvement in which there are provided a feeding-out passage and a feeding-out means for moving the packed product of which scaling is finished by said scaling unit in a direction perpendicular to said transferring passage, a discharging conveyor is abutted against the terminal end of said feeding-out passage at a right angle to change a moving direction of the packed product to a right angle.

40. Scaling and labeling apparatus as set forth in claim 39) in which said scaling unit scales the packed product while the product is being accepted on the transferring passage and temporarily stopped thereon.

41. Scaling and labeling apparatus as set forth in claim 39) or 40) in which the discharging means is of a conveyor with pushers which is reversely operated between the end of the feeding-out means and the discharging conveyor, and a delivery roller is rotatably arranged between said terminal end of the feeding-out passage and the discharging conveyor.

42. Scaling and labeling apparatus as set forth in claim 41) in which said delivery roller is of its height adjustable one.

43. Scaling and labeling apparatus as set forth in claim 41) in which said delivery roller is cooperatively rotated with the driving mechanism.

44. Scaling and labeling apparatus as set forth in claim 41) in which said delivery roller is fixed to the main body of the frame at the feeding-out passage by the support arm in such a way as it may be folded.

45. Scaling and labeling apparatus as set forth in claim 41) in which said delivery roller is fixed to the discharging conveyor by the support arm in such a way as it may be folded.

* * * * *